(12) United States Patent
Chun et al.

(10) Patent No.: US 7,974,310 B2
(45) Date of Patent: *Jul. 5, 2011

(54) APPARATUS AND METHOD FOR CONSTRUCTING A DATA UNIT THAT INCLUDES A BUFFER STATUS REPORT

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,733

(22) Filed: Mar. 19, 2010

(65) Prior Publication Data

US 2010/0172376 A1 Jul. 8, 2010

Related U.S. Application Data

(63) Continuation of application No. 12/379,374, filed on Feb. 19, 2009, now Pat. No. 7,706,410.

(60) Provisional application No. 61/030,211, filed on Feb. 20, 2008, provisional application No. 61/033,373, filed on Mar. 3, 2008, provisional application No. 61/037,309, filed on Mar. 17, 2008, provisional application No. 61/044,558, filed on Apr. 14, 2008, provisional application No. 61/046,784, filed on Apr. 21, 2008, provisional application No. 61/047,091, filed on Apr. 22, 2008, provisional application No. 61/048,289, filed on Apr. 28, 2008, provisional application No. 61/058,198, filed on Jun. 2, 2008, provisional application No. 61/073,743, filed on Jun. 18, 2008, provisional application No. 61/074,998, filed on Jun. 23, 2008, provisional application No. 61/087,153, filed on Aug. 7, 2008.

(30) Foreign Application Priority Data

Feb. 18, 2009 (EP) ...................................... 09153130
Feb. 18, 2009 (KR) ........................ 10-2009-0013368

(51) Int. Cl.
*H04J 3/24* (2006.01)
(52) U.S. Cl. ......................................... 370/474; 370/528
(58) Field of Classification Search .................. 370/474, 370/522, 528, 412
See application file for complete search history.

(56) References Cited

U.S. PATENT DOCUMENTS

2006/0058038 A1 3/2006 Das et al.
(Continued)

FOREIGN PATENT DOCUMENTS

WO WO 2006/052085 5/2006

OTHER PUBLICATIONS

Ericsson: "MAC PDU Structure" 3rd Generation Partnership Project 3GPP, Technical Specification Group (TSG) Radio Access Network (RAN), R2-072563, Jun. 25, 2007.

(Continued)

*Primary Examiner* — Brian D Nguyen
(74) *Attorney, Agent, or Firm* — McKenna Long & Aldridge LLP

(57) ABSTRACT

An apparatus and method for constructing a data unit that includes a buffer status report (BSR) such that when BSR triggering is performed, the size(s) of the necessary sub-header(s) are also to be considered together in addition to the BSR size. There is a checking unit that checks whether any padding region is available in a MAC PDU that was constructed, a comparing unit that compares the number of padding bits with the size of a buffer status report (BSR) plus its sub-header, and a processing unit that cooperates with the checking unit and the comparing unit to trigger a buffer status report (BSR) procedure if the number of padding bits is larger than the size of the BSR plus its sub-header, including the BSR and its sub-header in the MAC PDU, and setting an LCID in the sub-header to indicate a BSR is included, the BSR having been triggered due to padding. Using such apparatus allows the sub-header(s) to be inserted (included) into the MAC PDU (or transport block (TB) or other data unit).

18 Claims, 26 Drawing Sheets

U.S. PATENT DOCUMENTS

| | | | |
|---|---|---|---|
| 2006/0143444 | A1 | 6/2006 | Malkamaki et al. |
| 2006/0165045 | A1 | 7/2006 | Kim et al. |
| 2007/0064608 | A1 | 3/2007 | Rinne et al. |
| 2007/0283032 | A1* | 12/2007 | Kim et al. .................. 709/230 |
| 2008/0004058 | A1 | 1/2008 | Jeong et al. |
| 2008/0081628 | A1* | 4/2008 | Ye et al. .................. 455/445 |
| 2008/0085717 | A1* | 4/2008 | Chhabra et al. .............. 455/450 |
| 2008/0120445 | A1* | 5/2008 | Jang et al. .................. 710/52 |
| 2008/0146242 | A1 | 6/2008 | Alanara et al. |
| 2008/0165698 | A1 | 7/2008 | Dalsgaard et al. |
| 2009/0113086 | A1 | 4/2009 | Wu et al. |
| 2009/0163211 | A1 | 6/2009 | Kitazoe et al. |
| 2009/0175229 | A1 | 7/2009 | Tseng |
| 2009/0196177 | A1 | 8/2009 | Teyeb et al. |
| 2009/0196236 | A1 | 8/2009 | Cai et al. |
| 2009/0233612 | A1 | 9/2009 | Iwamura et al. |
| 2009/0252124 | A1 | 10/2009 | Yeo et al. |
| 2010/0074230 | A1 | 3/2010 | Ishii et al. |

OTHER PUBLICATIONS

Nortel: "MAC Short Padding LCID" 3$^{rd}$ Generation Partnership Project 3GPP, R2-081049, Feb. 4, 2008.

Nokia Corporation et al.: "Criteria for Short and Long BSR", 3$^{rd}$ Generation Partnership Project 3GPP, R2-080015, Jan. 7, 2008.

Nokia Corporation et al.: "LCID for Padding BSR" 3$^{rd}$ Generation Partnership Project 3GPP, R2-083835, Aug. 18, 2008.

Motorola: "MAC Padding & Removal of Length Field for Last Element", 3$^{rd}$ Generation Partnership Project 3GPP, R2-081123, Feb. 4, 2008.

LG Electronics Inc: "Discussion on Buffer Status Reporting Procedure", 3$^{rd}$ Generation Partnership Project 3GPP, R2-081084, Feb. 5, 2008.

LG Electronics Inc: "Correction to MAC Padding BSR", 3$^{rd}$ Generation Partnership Project 3GPP, R2-083712, Jul. 4, 2008.

LG Electronics Inc: "Issue with MAC Padding", 3$^{rd}$ Generation Partnership Project 3GPP, R2-082259, Apr. 29, 2008.

LG Electronics Inc: "Issue with MAC Padding", 3$^{rd}$ Generation Partnership Project 3GPP, R2-081593, Mar. 24, 2008.

"CR to 25.321. Introduction of Enhanced Uplink"; 3GPP TSG-RAN Meeting #26, Dce. 8, 2004.

U.S. Appl. No. 61/018,676 (Tseng), filed Jan. 3, 2008.

3GPP TS 36.321 v8.0.0 (Dec. 2007), Technical Specification, "3$^{rd}$ Generation Partnership Project; Technical Specification Group Radio Access Network; Evolved Universal Terrestrial Radio Access (E-UTRA) Medium Access Control (MAC) protocol specification (Release 8)", pp. 19-21.

* cited by examiner

R/R/E/LCID/F/L sub-header with
7-bits L field

R/R/E/LCID/F/L sub-header with
15-bits L field

R/R/E/LCID sub-header (a) MAC PDU with data and padding (b) MAC PDU with data and BSR and padding (a) Implementation 1

(b) Implementation 2

(a) Implementation1

(b) Implementation 2    (c) Implementation 3

(a) case 1

(b) will occur rather than (a)

(b) case 2

(a) Case A (b) Case B        (c) Case C (a) Case 1

(a) Implementation 1

(b) Implementation 2

(a) case 1

(b) will occur rather than (a)

(b) case 2

(a) case1

(b) and (c) will occur rather than (a)

(b) case2 explicit padding BSR (c) case3, explicit padding BSR (a) case 1

(b) case 2, Implicit padding BSR (C) case3, Implicit padding BSR (a) Implementation1

(b) Implementation2

(a) Implementation1

(b) Implementation2

(a) Case A (b) Case B (c) Case C (a) Case A (b) Case B (c) Case C (a) Case A (b) Case B (c) Case C

APPARATUS AND METHOD FOR CONSTRUCTING A DATA UNIT THAT INCLUDES A BUFFER STATUS REPORT

CROSS-REFERENCE

This is a continuation of application Ser. No. 12/379,374, filed on Feb. 19, 2009, now U.S. Pat. No. 7,706,410 which claims priority to European application no. 09153130.1 and to Korean application no. 10-2009-0013368, both filed on Feb. 18, 2009, and to provisional application no. 61/030,211, filed on Feb. 20, 2008; provisional application No. 61/033,373, filed on Mar. 3, 2008; provisional application No. 61/037,309, filed on Mar. 17, 2008; provisional application No. 61/044,558, filed on Apr. 14, 2008; provisional application No. 61/046,784, filed on Apr. 21, 2008, provisional application No. 61/047,091, filed on Apr. 22, 2008, provisional application No. 61/048,289, filed on Apr. 28, 2008; provisional application No. 61/058,198, filed on Jun. 2, 2008; provisional application No. 61/073,743, filed on Jun. 18, 2008; provisional application No. 61/074,998, filed on Jun. 23, 2008; and provisional application No. 61/087,153, filed on Aug. 7, 2008, all of which are fully incorporated herein by reference.

RELATED APPLICATIONS

The present application relates to and is co-pending with U.S. application Ser. No. 12/458,783, filed Jul. 22, 2009.

BACKGROUND

The present invention relates to an apparatus and method for constructing a data unit that includes a buffer status report (BSR). In the related art, buffer status reporting was performed, but radio resources were unnecessarily wasted. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that constructing a data unit that includes a buffer status report (BSR) is improved, such that when protocol data units (PDUs) (or Transport Blocks (TB) or other types of data units) are constructed, the remaining available portions therein are used as a padding region for inserting buffer status information, which results in more efficient use of radio resources.

DETAILED DESCRIPTION

The inventive concepts and features herein related to processing of buffer status reports (BSRs) are explained in terms of a Long Term evolution (LTE) system or other so-called 4 G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

The present invention relates to exchanging data between a base station and a mobile terminal in a so-called Long Term Evolution (LTE) system. In particular, in a MAC entity that constructs a MAC PDU (or other type of data unit such as a transport block) upon receiving data from each logical channel, when padding space in a MAC PDU is available, the mobile terminal effectively sends buffer state information using such padding region of the MAC PDU such that unnecessary waste of radio resources is minimized.

Figure 1:
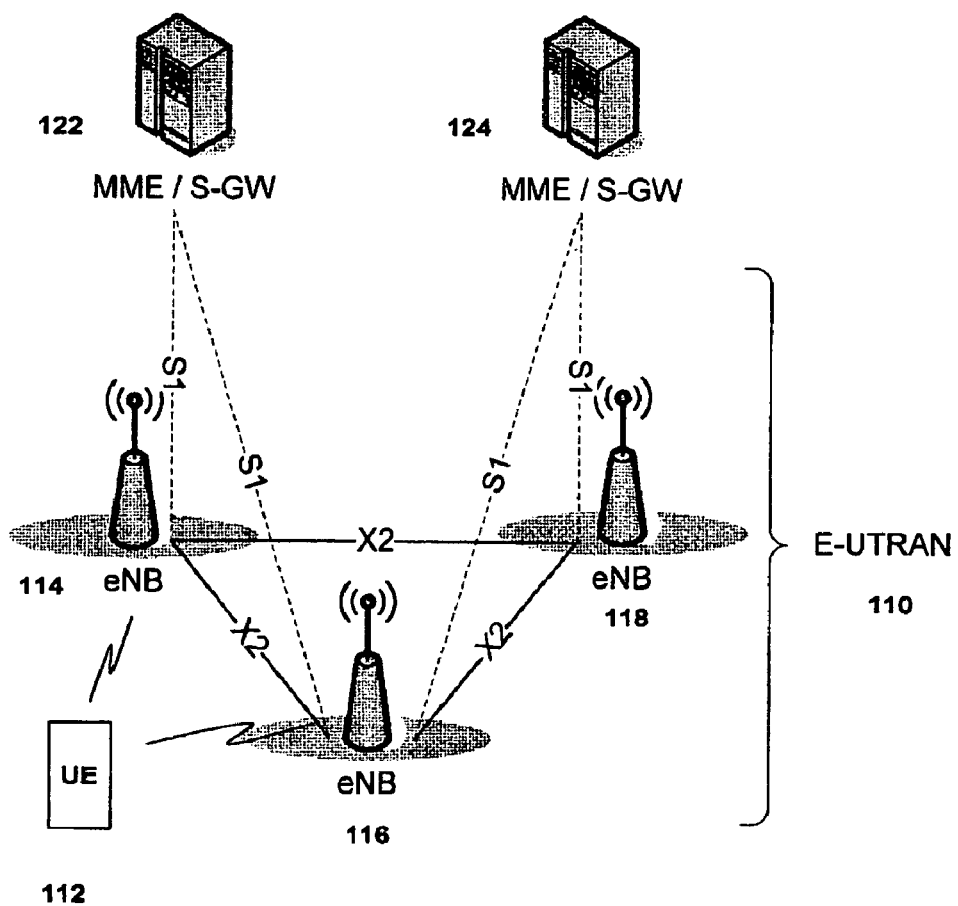
FIG. 1 shows an exemplary network architecture for an E-UMTS (Evolved Universal Mobile Telecommunications System).

FIG. 1 shows the exemplary network architecture for an E-UMTS (Evolved Universal Mobile Telecommunications System) 100, which is a type of mobile communications system. The E-UMTS system is a system that has evolved from the UMTS system and its basic standardization tasks are now being performed by the 3GPP organization. The E-UMTS system can be said to be a Long Term Evolution (LTE) system, which is a type of so-called 4G or next generation system that has evolved from the current 3G mobile communication systems.

The E-UMTS network 100 can be generally distinguished into the E-UTRAN (Evolved Universal Terrestrial Radio Access Network) 110 and the CN (core network). The E-UTRAN is comprised of a mobile terminal 112 (e.g. user equipment (UE), mobile station, handset, mobile phone, etc.), a base station 114, 116, 118 (e.g., an eNode B, access point (AP), network node, etc.) a serving gateway (S-GW) 122, 124 located at an end of the network for connection with an external network, and a mobility management entity (MME) 122, 124 that manages various mobility aspects of the mobile terminal. For a single eNode B, one or more cells (or regions, areas, etc.) may exist.

Figure 2:
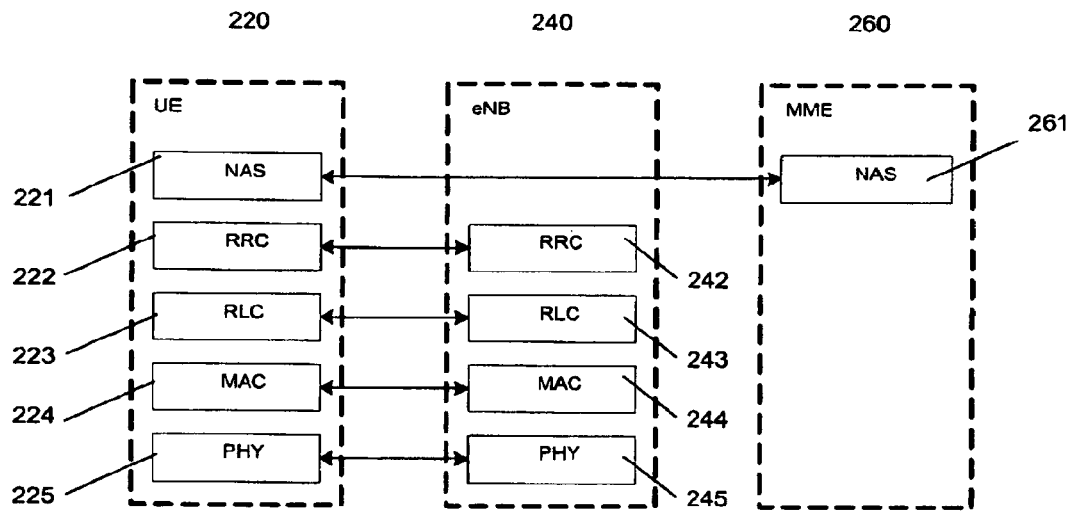
FIG. 2 shows the control plane radio interface protocol between the mobile terminal and base station based on the 3GPP radio access network standard.
Figure 3:
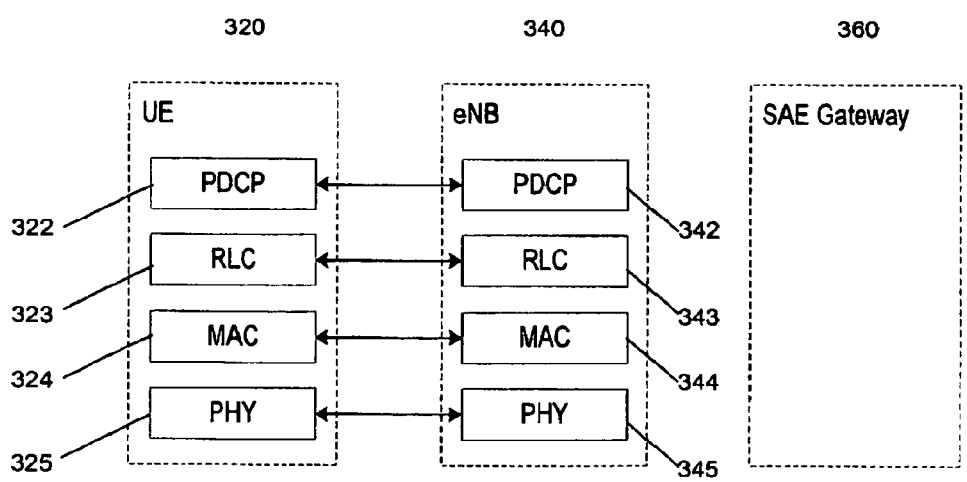
FIG. 3 shows the user plane radio interface protocol between the mobile terminal and base station based on the 3GPP radio access network standard.

FIGS. 2 and 3 show the radio interface protocol between the mobile terminal and base station based on the 3GPP radio access network standard. This radio interface protocol is divided horizontally into a physical layer, a data link layer, and a network layer, and is divided vertically into a user plane for transmitting data information and a control plane for transferring control signals (signaling). These protocol layers can be divided into L1 (Layer 1), L2 (Layer 2), and L3 (Layer 3), which are the lower three layers of the OSI (Open System Interconnection) standard model, which is well known in communication systems.

Hereafter, the control plane of the radio protocol in FIG. 2 and the user plane of the radio protocol in FIG. 3 will be described respectively.

In Layer 1, the physical layer 225-245, 325-345 uses one or more physical channels to provide an information transfer service. The physical layer is connected to the MAC (Medium Access Control) layer 224-244, 324-344 located above via one or more transport channels, and data is transferred between the MAC layer and the physical layer through these transport channels. Also, between respectively different physical layers, such as the physical layer in the transmitter (transmitting side) and the physical layer in the receiver (receiving side), data is transferred via one or more physical channels.

In Layer 2, the MAC layer provides service to a RLC (Radio Link Control) layer 223-243, 323-343, which is an upper layer, via one or more logical channels. The RLC layer supports the transmission of data with reliability. The PDCP (Packet Data Convergence Protocol) layer 322-342 in Layer 2 performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data.

Located at the uppermost portion of Layer 3, the RRC (Radio Resource Control) layer 222-242 is only defined in the control plane and is responsible for the control of logical channels, transport channels and physical channels with relation to the configuration, re-configuration and release of radio bearers (RBs). Here, a radio bearer is a service provided by Layer 2 for transferring data between the mobile terminal and E-UTRAN.

Hereafter, aspects of the RACH (Random Access CHannel) will be explained. The RACH channel is used for transmitting relatively short length data via the uplink. In particular, the RACH is used when there is a signaling message or user data to be transmitted via the uplink by a mobile terminal that did not receive allocation of dedicated radio resources, or may also be used when the base station should instruct the mobile terminal to perform a RACH procedure.

As described above, the two main things that comprise the E-UTRAN are the base station and the mobile terminal. The radio resources for a single cell are comprised of uplink radio resources and downlink radio resources. The base station is responsible for the allocation and control of uplink radio resources and downlink radio resources of a cell. Namely, the base station determines what radio resources are to be used by what mobile terminals at certain moments in time. For example, the base station can determine that 3.2 seconds from now, the frequency from 100 Mhz to 101 Mhz will be allocated to user 1 for a duration of 0.2 seconds to allow downlink data transmissions. Also, after the base station makes such determination, these matters can be informed to the corresponding mobile terminal such that this mobile terminal receives downlink data. Likewise, the base station can determine when a certain mobile terminal should use what amount of which radio resources for data transmission via the uplink, and the base station informs the mobile terminal about its determination, to thus allow the mobile terminal to transmit data during the determined time period using the determined radio resources.

If the base station manages radio resources in a dynamic manner, efficient use of radio resources would be possible. Typically, a single mobile terminal continuously uses a single radio resource during a call connection. This is not preferable considering that most recent services are IP packet-based. The reason is that most packet services do not continuously generate packets during the duration of a call connection, and there are many time periods in which nothing is transmitted during the call. Despite this, continued allocation of a radio resource to a single mobile terminal is inefficient. To solve this, the mobile terminal of a E-UTRAN system uses a method in which radio resources are allocated to the mobile terminal only while service data exists.

In more detail, for efficient use of radio resources in an LTE system, the base station should know about the type and amount of data that each user wishes to transmit. The data for the downlink is transferred to the base station from the access gateway. Thus, the base station knows about how much data needs to be transferred via the downlink to each user. In contrast, for uplink data, if the mobile terminal itself does not inform the base station about the information related to the data to be transferred via the uplink, the base station cannot know how much radio resources are needed for each mobile terminal. Thus, for the base station to appropriately allocate uplink radio resources to the mobile terminal, each mobile terminal should provide to the base station, the necessary information that allows the base station to perform scheduling of radio resources.

To do so, when the mobile terminal has data that it should transmit, this is informed to the base station, and the base station transfers a resource allocation message (or uses some other means of informing) to the mobile terminal based upon such information.

In the above procedure, namely, when the mobile terminal has data to be transmitted, when such is informed to the base station, the mobile terminal informs the base station about the amount of data stored in its buffer. This is achieved by means of a buffer status report (BSR) or some other buffer status (or state) information.

However, the buffer status report is generated in the form of a MAC control element (CE), which is included in a MAC PDU (protocol data unit) (or some other type of data unit or transport block) and transmitted from the mobile terminal to the base station. Namely, uplink radio resources are needed for transmitting the buffer status report (BSR). This would mean that uplink radio resource allocation request information, for transmitting the BSR, needs to be sent. When a BSR has been generated, if there are any uplink radio resources that have been allocated, the mobile terminal immediately uses the uplink radio resources to transmit the BSR. Such process of sending the BSR from the mobile terminal to the base station may be called a BSR procedure.

Hereafter, the MAC PDU structure will be explained with reference to FIGS. 4 through 8 that show various exemplary MAC PDU formats used by a MAC entity (such as 224 and 244 in FIG. 2 or 324, 344 in FIG. 3).

Figure 4:
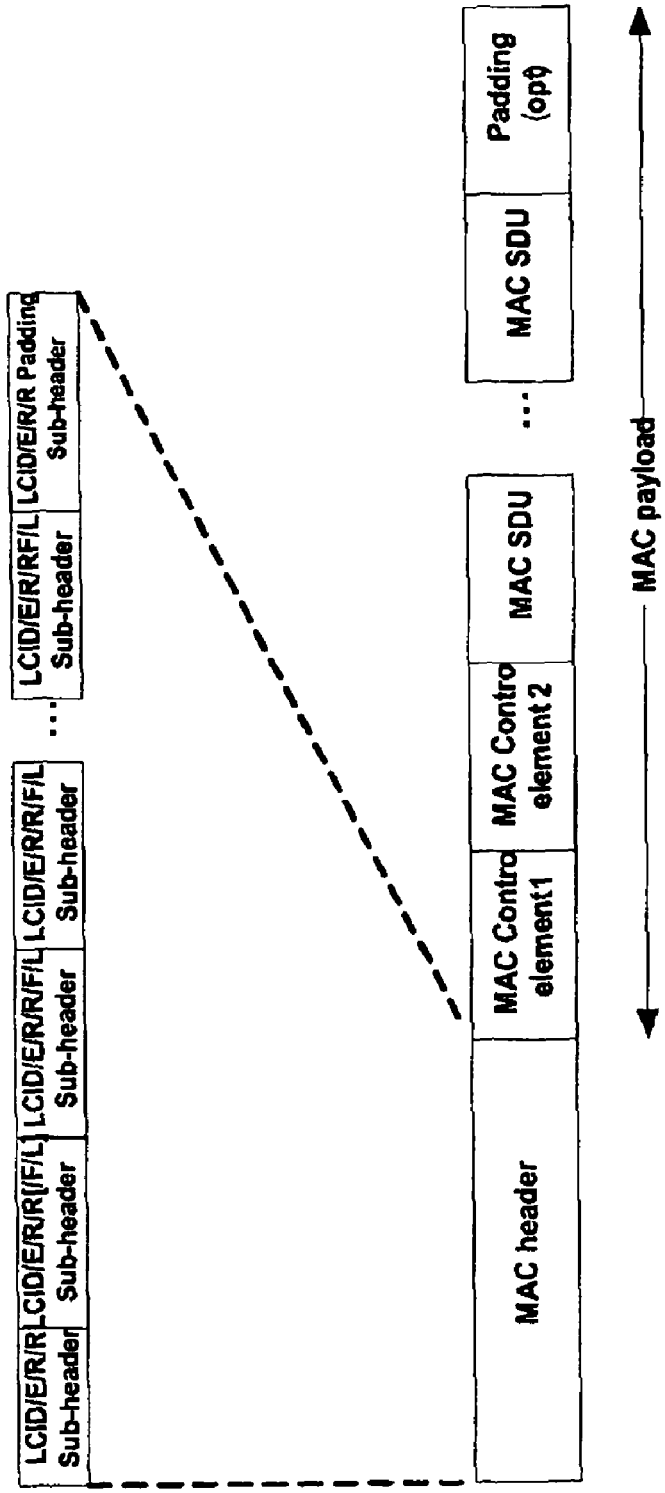
FIG. 4 shows an exemplary MAC PDU format used by a MAC entity.
Figure 5:
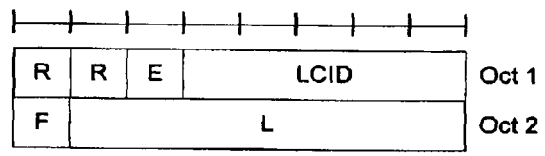
FIG. 5 shows exemplary MAC PDU sub-header formats used by a MAC entity.
Figure 5:
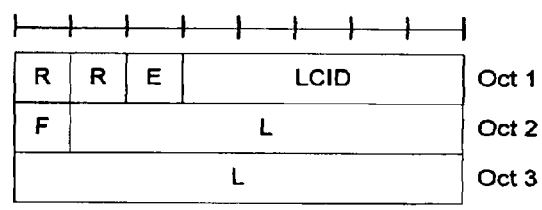
Figure 6:
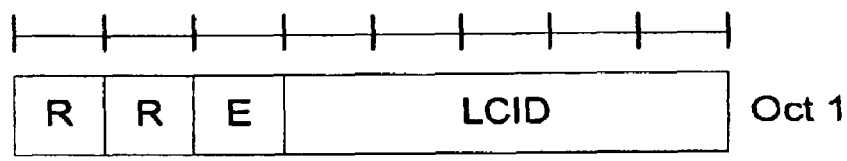
FIG. 6 shows an exemplary MAC PDU sub-header format used by a MAC entity.

FIG. 4 shows an exemplary format of a PDU used in the MAC entity. The LCID field indicates whether a MAC SDU or a MAC Control Element (CE) is related thereto. If related to a MAC SDU, this indicates which logical channel the MAC SDU pertains to, and if related to a MAC CE, this indicates the kind or type of MAC CE. The L field informs about the size of the MAC SDU with respect to the MAC SDU. The E field informs about whether any additional MAC sub-headers exist. In the above process, if the size of the corresponding MAC SDU or the MAC CE is 127 or smaller, a 7-bit L field is used, and otherwise a 15-bit L field is used (as shown in FIG. 5). Also, the MAC SDU included in the MAC PDU is the last among the data fields included in the MAC PDU, and the related MAC sub-header as shown in FIG. 6 is used. Alternatively, with respect to a MAC CE having a fixed size, the MAC sub-header as shown in FIG. 6 is used. In other situations, the MAC sub-header shown in FIG. 5 is used.

Figure 7:
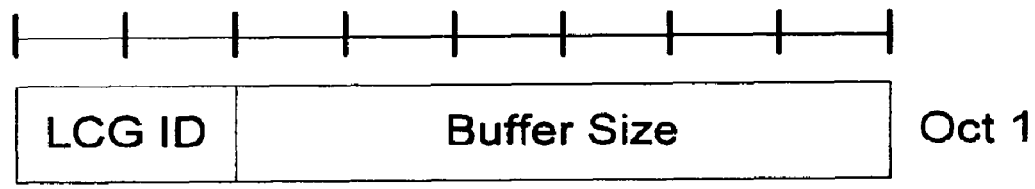
FIG. 7 shows an exemplary short BSR and truncated BSR MAC control element.
Figure 8:
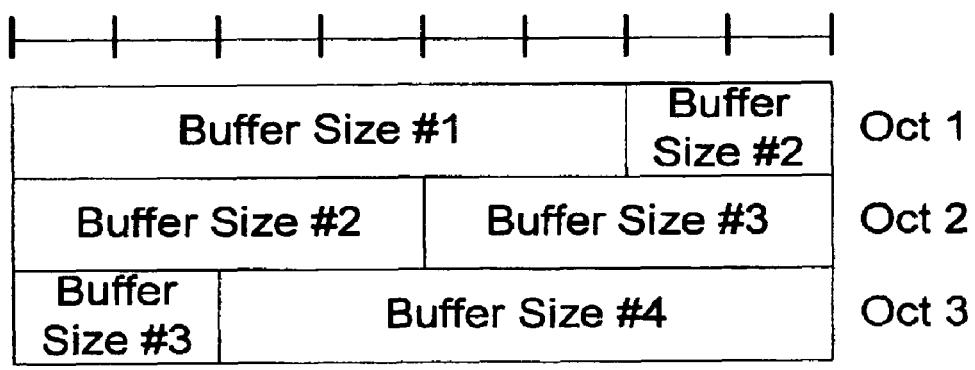
FIG. 8 shows an exemplary long BSR MAC control element.

FIGS. 7 and 8 show the exemplary formats of a BSR report. A short BSR or a long BSR may be used depending on the number of logical channel groups that have data and on the size of the available space in the MAC PDU. Here, the short BSR and the long BSR refer to the relative length of the BSR. As such, other similar terms may be used to express such types of BSR. For example, the short BSR may be called a truncated or shortened BSR, while the long BSR may be called an expanded or lengthened BSR.

Referring back to FIGS. 4 through 6, each field used therein will be explained.

The MAC header is of variable size and consists of the following fields:

LCID: The Logical Channel ID field identifies the logical channel instance of the corresponding MAC SDU or the type of the corresponding MAC control element or padding as described in Tables 1 and 2 (shown below) for the DL and UL-SCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;

L: The Length field indicates the length of the corresponding MAC SDU or MAC control element in bytes. There is one L field per MAC PDU subheader except for the last subheader and sub-headers corresponding to fixed-sized MAC control elements. The size of the L field is indicated by the F field;

F: The Format field indicates the size of the Length field. There is one F field per MAC PDU subheader except for the last subheader and sub-headers corresponding to fixed-sized MAC control elements. The size of the F field is 1 bit. If the size of the MAC SDU or MAC control element is less than 128 bytes, the UE shall set the value of the F field to 0, otherwise the UE shall set it to 1;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

The MAC header and sub-headers are octet aligned.

Hereafter, information about the values used in the LCID is explained in the following tables for the downlink shared channel (DL-SCH) and the uplink shared channel (UL-SCH).

TABLE 1

Values of LCID for DL-SCH

| Index | LCID values |
|---|---|
| 00001-xxxxx | Identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 2

Values of LCID for UL-SCH

| Index | LCID values |
|---|---|
| 00001-yyyyy | Identity of the logical channel |
| yyyyy-11010 | Reserved |
| 11011 | Power Headroom Report |
| 11100 | C-RNTI |
| 11101 | Short Buffer Status Report |
| 11110 | Long Buffer Status Report |
| 11111 | Padding |

Hereafter, an exemplary method of how the MAC entity constructs a MAC PDU will be described.

When multiple radio bearers (RBs) are multiplexed to a single transport channel and transmitted, the MAC layer in a mobile terminal (that can support LTE) uses the following rules with respect to the radio resources given for each transmission time in order to determine the amount of data to be transmitted.

1) First, with respect to the multiplexed transport channels, the transmission data amount is determined in sequentially decreasing order based on the Logical Channel Priority (LCP) of each logical channel, and according to the determined data amount, the MAC PDU is constructed using the data of the logical channels.

2) If any radio resources remain, the above step 1) can be repeated such that, with respect to the multiplexed transport channels, the transmission data amount is determined in sequentially decreasing order based on the Logical Channel Priority (LCP) of each logical channel.

Here, the LCP is currently being discussed as being defined from 1 through 8, with 1 being the highest and 8 being the lowest. However, the specific definitions may change in future discussions. Also, in the above procedure, if there is any MAC CE (Control Element) that needs to be sent, such MAC CE is firstly included into the MAC PDU.

The mobile terminal may perform triggering of the BSR procedure in at least one of the following situations:

a) initially, all buffers do not contain any data, but when data newly arrives at a certain buffer (Regular BSR);

b) when data arrives at an empty buffer, and the priority of the logical channel related to that buffer is higher than the priority of the logical channel having data in the buffer previously (Regular BSR);

c) when a cell is changed (Regular BSR);

d) upon lapse of a certain time after the last transmission of the BSR (Periodic BSR); and e) if there is any available space remaining in the constructed MAC PDU (Padding BSR).

Among the above triggers, if the BSR is triggered due to the last situation, such BSR may be called a Padding BSR. The mobile terminal constructs the MAC PDU according to the amount of radio resources allocated from the base station, namely, according to the size of the MAC PDU. Here, the MAC entity of the mobile terminal sequentially includes (or inserts) into the MAC PDU, the data that was stored in the buffer(s) of the logical channels, with respect to each logical channel established for the mobile terminal. If any available space remains in the MAC PDU even after all data stored with respect to each logical channel have been included (inserted), the BSR procedure is triggered and the padding BSR triggered as a result thereof is included into the MAC PDU for construction thereof, and such is transmitted to the base station.

However, in certain situations, the BSR occurring due to padding is located at the very last portion of the MAC PDU. Namely, after the MAC entity constructs a MAC PDU using the data of each logical channel, if any space remains in the MAC PDU, the BSR is additionally included (inserted) at the rear of the MAC PDU. This is shown in FIG. 9.

Figure 9:
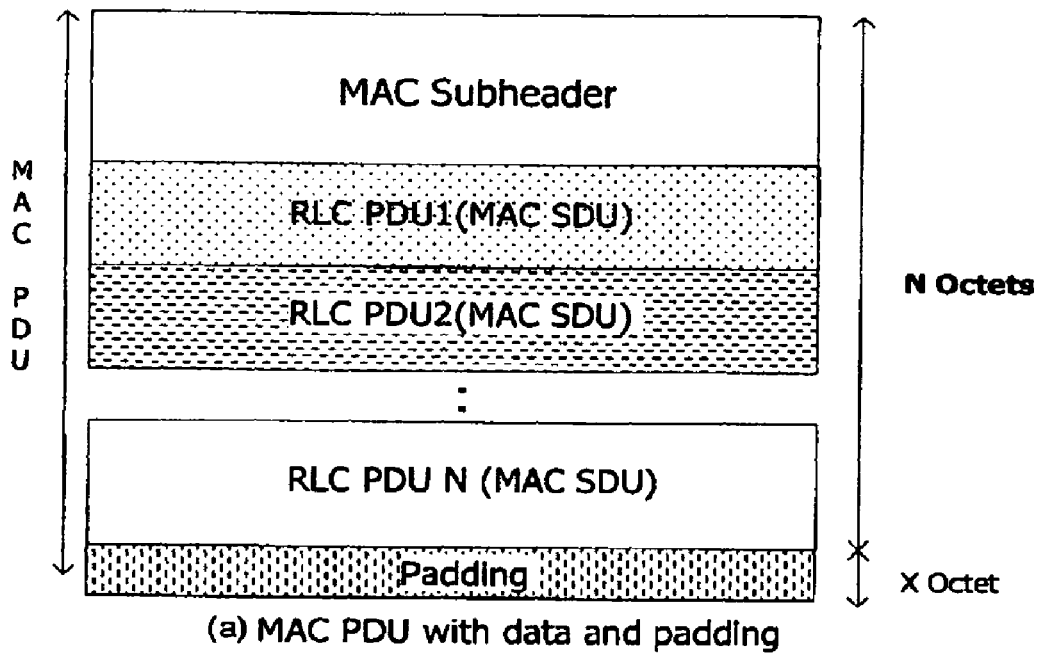
FIG. 9 shows an exemplary MAC PDU with data and padding, with and without BSR.
Figure 9:
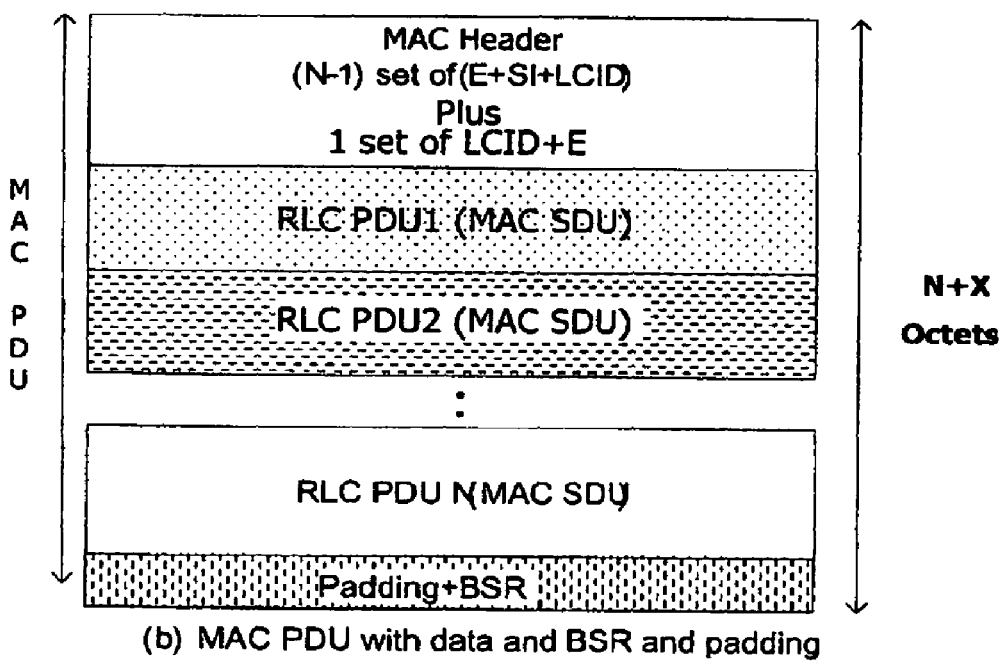

In FIG. 9, it is assumed that the mobile terminal has received allocation of radio resources from the base station for constructing a MACPDU having a size of X+N bytes. Here, based on the data stored with respect to each logical channel, the MAC entity begins to fill the MAC PDU for construction. In FIG. 9, drawing (a) shows that padding occurs when the MAC PDU in constructed by the MAC entity using all data stored in its buffer. If the size of padding is greater than the size of the BSR, the MAC entity adds the BSR into the padding region.

Here, as can be seen in FIG. 9, because it is not informed that the Padding BSR is included due to padding, the receiver that received the MAC PDU cannot effectively use the BSR information. Namely, the receiver cannot know which of the MAC PDU formats of drawings (a) or (b) in FIG. 9 has been received, thus even if the MAC PDU includes the BSR, the base station cannot perform proper allocation of radio resources using the BSR information.

Also, in certain situations, in order to send Padding BSR, there may be problems related to a reduced amount of user data being included in the MAC PDU.

Figure 10:
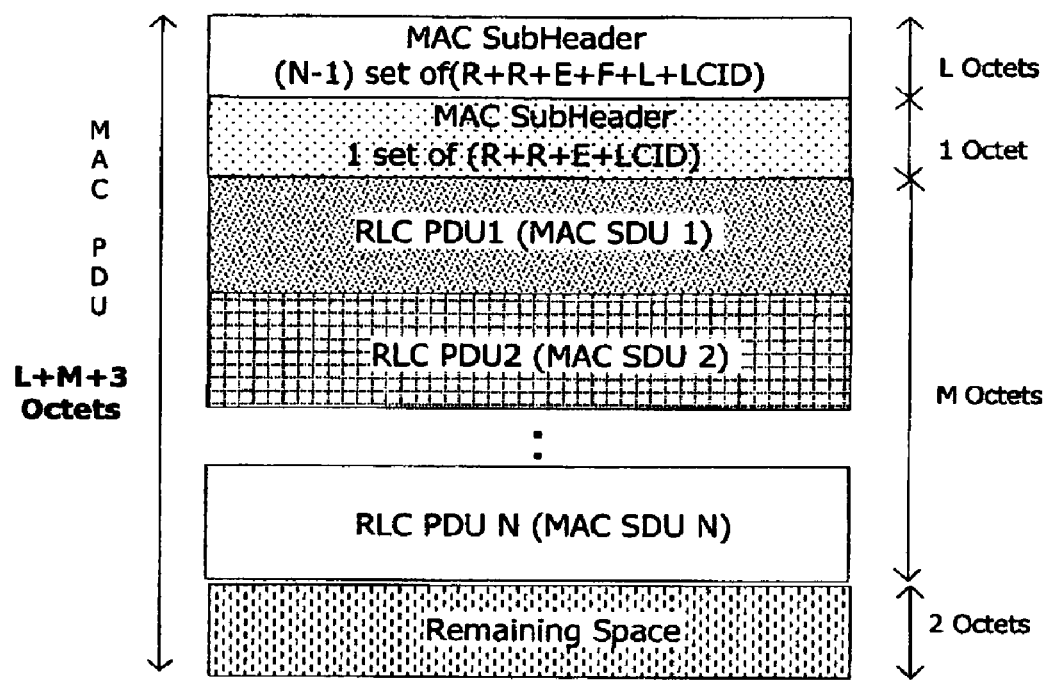
FIG. 10 shows an example where the mobile terminal received instructions to construct a MAC PDU having a size of L+M+3 bytes.

FIG. 10 shows an example where the mobile terminal received instructions to construct a MAC PDU having a size of L+M+3 bytes. In FIG. 10, the portion indicated as remaining space is a padding region, and is shown to have a length of 2 bytes. Here, because the Short BSR size is 1 byte, the mobile terminal determines that the Short BSR can be inserted into the remaining space, and Padding BSR is thus triggered. However, problems may arise when the MAC entity attempts to insert the Short Padding BSR. For example, as can be seen in FIG. 10, there is no L field included in the MAC sub-header of the RMC PDU N. But, if in the above procedure, when the Padding BSR is to be inserted, the RLC PDU N would no longer be the last element included in the MAC PDU. Thus, in certain situations, an L field must be included in the MAC sub-header of the MAC SDU, which is not the last element. As such, because the Padding BSR is forcibly inserted, the following error can occur.

Figure 11:
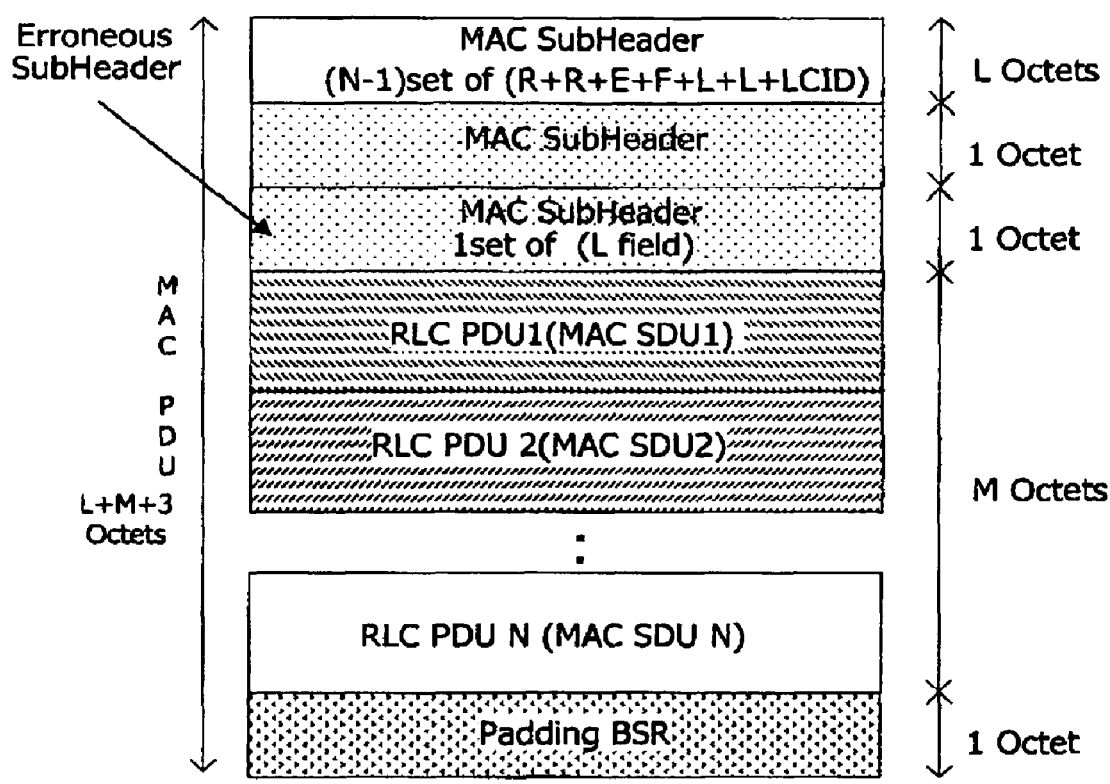
FIG. 11 shows an example where a MAC PDU has 2 bytes in the remaining space, 1 byte is used for the Padding BSR, and the MAC sub-header only has 1 byte for additional use.

Namely, as can be seen in FIG. 11, of the 2 bytes in the remaining space, 1 byte is used for the Padding BSR, and the MAC sub-header only has 1 byte for additional use. However, if the RLC PDU N requires an L field of 2 bytes, an error will occur. Thus, in order to construct a proper MAC sub-header, a 1-byte portion of the RLC PDU needs to be reduced.

The present invention provides specific procedures and rules used by the MAC entity to include or insert a Padding BSR into the MAC PDU in an effective manner when Padding BSR has been triggered. Various exemplary embodiments of the present invention will be described below.

First Embodiment

The Padding BSR is included (or inserted) at a position that is not the last portion of the MAC PDU. When the Padding BSR procedure is triggered, the Padding BSR may be inserted at a position that is just before the last position among the MAC SDUs or the MAC CEs of the MAC PDU. Accordingly, the MAC sub-headers related to the MAC SDUs, the MAC CEs, and the Padding BSR may also be arranged in the same order. When the Padding BSR procedure is triggered, the Padding BSR may be included (or inserted) in front of the other MAC SDUs of the MAC PDU. Accordingly, the MAC sub-headers related to the Padding BSR may also be arranged in the same order. When the Padding BSR procedure is triggered, the Padding BSR may be included (or inserted) behind the other MAC SDUs of the MAC PDU. Accordingly, the MAC sub-headers related to the Padding BSR may also be arranged in the same order.

When constructing the MAC PDU, after the MAC PDU is filled with the MAC SDUs and MAC CEs and their related MAC sub-headers, if there is any remaining space having a size that equals at least the total sum of the Short BSR, the Long BSR, and their MAC sub-headers, then the Short BSR, the Long BSR, and their MAC sub-headers are included (or inserted) into the MAC PDU. In this procedure, the MAC Padding BSR may be included in front of the MAC SDUs or MAC CEs of the MAC PDU. The MAC sub-headers related to the MAC Padding BSR may be included first among all the MAC sub-headers of the MAC PDU.

The present invention proposes that, upon triggering the Padding BSR, the MAC entity considers the size of the MAC sub-header related thereto. Namely, in constructing the MAC PDU, the MAC entity considers whether the MAC PDU has any padding space to thus consider the size of the BSR and the size of its related sub-header. For example, if the Short BSR size is 1 byte and its related sub-header size is also 1 byte, the size of this sub-header is also considered such that the BSR procedure (Short BSR) is triggered only if the MAC PDU remaining space is 2 bytes or more. Also, in this situation, the Padding BSR is triggered only if the sub-headers of the other MAC SDUs and the MAC CEs can be properly constructed. Here, proper construction means including a MAC sub-header that does not have a F/L field for MAC CEs that do not need an L field, including a MAC sub-header that has a F/L field for the remaining MAC SDUs excluding the MAC CE or the very last MAC SDU requiring an L field, and including a MAC sub-header that does not have a F/L field for the last MAC SDU.

In the above procedure, after the MAC PDU is constructed, and after the Padding BSR is triggered when there is some remaining space, the BSR is included (inserted) into the MAC PDU and such BSR is deemed to be a Regular BSR. Thus, the Padding BSR is handled in the same manner as a Regular BSR. Namely, in this situation, the Padding BSR has the same restrictions of the same location construction as that of a Regular BSR.

In the above procedure, when the Padding BSR procedure is triggered due to padding, in particular, when a Short BSR is included in the MAC PDU due to the Padding BSR, the Short BSR includes buffer information of a logical channel group related to the logical channel with highest priority among the logical channels (having buffered data) established for the mobile terminal.

Second Embodiment

The present invention proposes that the LCID field be used to directly (or explicitly) inform about a BSR being included in the MAC PDU upon BSR triggering due to padding, such that the receiver can easily determine and know that a BSR is included in the MAC PDU (especially when a BSR was included in the MAC PDU due to padding). More specifically, it is proposed that the MAC sub-header be used to indicate whether a BSR has been included.

Figure 12:
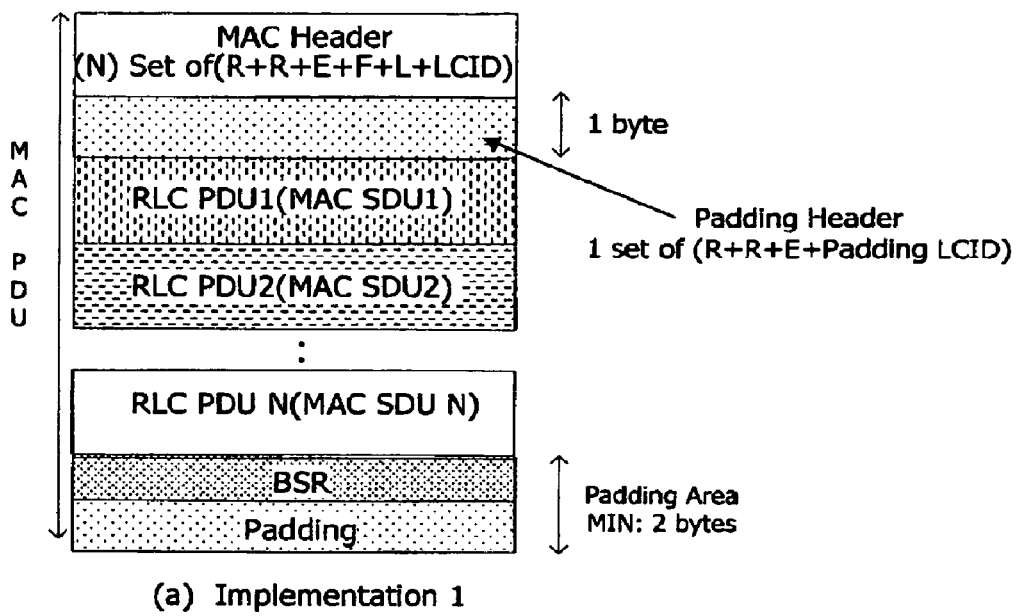
FIG. 12 shows two exemplary implementations of constructing a MAC PDU having BSR included therein, with and without a BSR sub-header.
Figure 12:
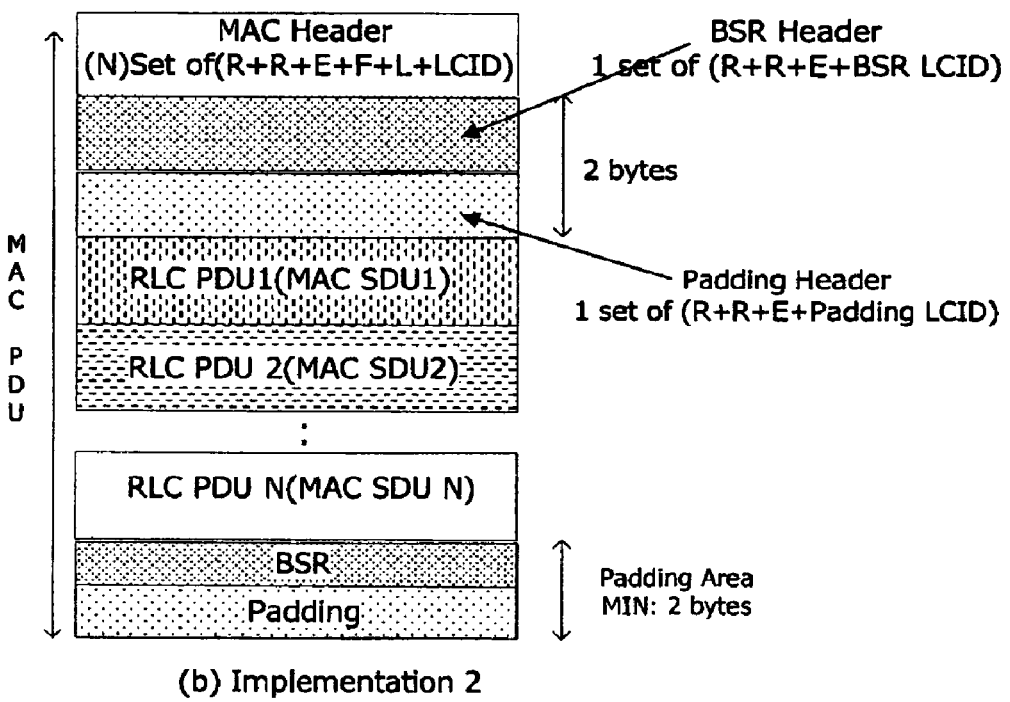

Referring to FIG. 12, drawing (a) shows that when the MAC PDU includes padding, based on the size of the padding, the receiver can know that the Padding BSR has been included. In drawing (b), even if the BSR is included in the MAC PDU due to padding, a MAC sub-header having a set LCID field related to the included BSR is inserted into the MAC PDU such that the existence of the BSR is directly (or explicitly) informed.

According to another method of the present invention, the receiver considers the BSR to be a Padding BSR, when the BSR is included in the MAC PDU and when padding exists for the MAC PDU.

In the above procedure, when Padding BSR is triggered due to a padding procedure, and as a result, when BSR is included in the MAC PDU, a separate LCID that is different from the allocated LCID can be designated to indicate either a Short BSR or a Long BSR. Namely, the mobile terminal sets the LCID field (that was separately designated) in the MAC sub-header related to the BSR, if the BSR is included in the MAC PDU when the Padding BSR was triggered due to padding.

Third Embodiment

Figure 13:
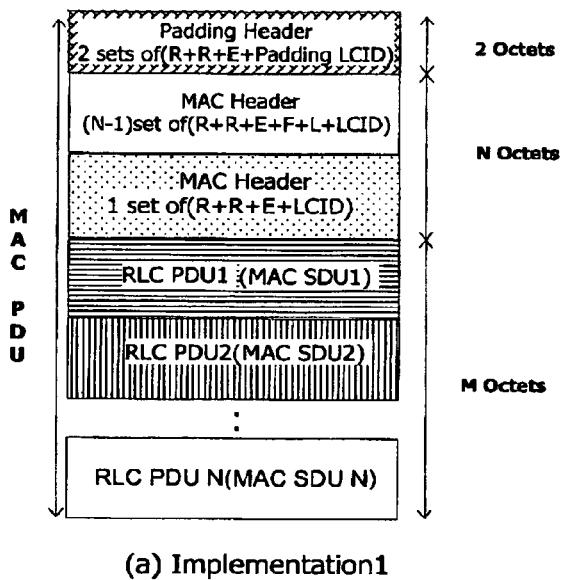
FIG. 13 shows three exemplary implementations of constructing a MAC PDU having BSR included therein.
Figure 13:
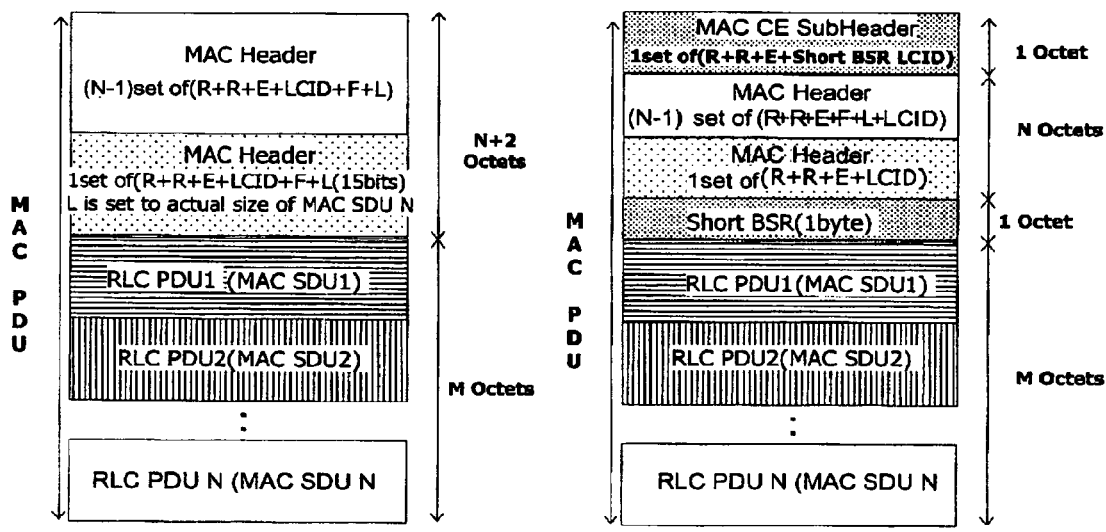

Referring to FIG. 13 having drawings (a), (b) and (c), when constructing the MAC PDU according to the present invention, the MAC entity of the sender (or transmitting side) takes the data transferred from each logical channel and the MAC Control Elements, which are included (or filled or inserted) into the MAC PDU, and if the MAC PDU has a 2 byte space remaining, such remaining space is used for handling the Padding BSR. Various applications using this concept are described below.

In the present invention, when constructing the MAC PDU, the MAC entity of the sender takes the data transferred from each logical channel and the MAC Control Elements (CE), which are included (or filled or inserted) into the MAC PDU, and if the MAC PDU has a 2 byte space remaining, a plurality of padding headers (each padding header being 1 byte long) are included to fill the remaining space of the MAC PDU.

In the present invention, when constructing the MAC PDU, the MAC entity of the sender takes the data transferred from each logical channel and the MAC Control Elements (CE), which are included (or filled or inserted) into the MAC PDU, and if the MAC PDU has a 2 byte space remaining, such 2 byte space is filled such that an L field is included in the last MAC sub-header.

In the present invention, when constructing the MAC PDU, the MAC entity of the sender takes the data transferred from each logical channel and the MAC Control Elements (CE), which are included (or filled or inserted) into the MAC PDU, and if the MAC PDU has a 2 byte space remaining, a Padding BSR (namely a 1 byte BSR for the MAC sub-header) and a 1 byte Short BSR are included to fill the remaining space of the MAC PDU.

It should be noted that the above procedures can also be performed in a similar manner for a MAC PDU with a remaining space of not only 2 bytes, but for any number of bytes, such as 4 bytes.

Fourth Embodiment

When the base station constructs and transmits a MAC PDU to the mobile terminal, if a padding space is created after the MAC PDU is constructed, a command for timing alignment (i.e., a TAC command) may be included in the MAC PDU. Such TAC command can be used by the mobile terminal to adjust its transmission timing on the uplink. For example, when 2 bytes in the MAC PDU remain after the MAC PDU is constructed, the base station may allocate 1 byte for the sub-header of the TAC command and allocate the other 1 byte for the TAC command itself that provides timing instructions for the mobile terminal to adjust its transmissions on the uplink. Also, even if 1 byte of padding space remains, the base station does not include the related MAC sub-header but the TAC command is included in the MAC PDU and transmitted.

Fifth Embodiment

If the mobile terminal determines that padding space exists and tries to trigger the Padding BSR, more accurate rules are provided such that the triggering of the Padding BSR is prevented if the padding BSR cannot actually be included in the MAC PDU. Thus in the present invention, when the mobile terminal uses the MAC CEs and MAC SDUs to construct a MAC PDU, the mobile terminal checks the remaining space by obtaining the size of the padding byte, which is the MAC PDU size minus the sum of the sizes of the MAC SDUs, the MAC CEs, and their MAC sub-headers. In this calculation, for the last element included in the MAC PDU (namely, the last MAC SDU), the mobile terminal assumes that an L field would be included in the MAC sub-header related to the MAC SDU. If the last element is a MAC CE, and if such MAC CE has a variable size, the mobile terminal assumes that an L field is included in the MAC sub-header related to that MAC CE and performs the calculation. Namely, assuming that the MAC sub-header for the last element is "R/R/E/LCID/F/L" and the size of the padding bit for the MAC PDU is calculated. Also, only if the padding byte size is the same as or greater than the sum of the BSR size and the size of its related MAC sub-header, then the Padding BSR would be triggered.

Namely, when calculating the number of padding bytes, the F/L field(s) in the MAC sub-header(s) related to all MAC SDUs included in the MAC PDU are included in the calculations. Here, even for the MAC CEs that have variable size, calculations are performed by including the F/L field in the MAC sub-header related to the MAC CE. Thus, if the number of padding bytes is the same as or greater than the sum of the BSR and its related MAC sub-headers, only then would the Padding BSR be triggered.

Sixth Embodiment

Figure 14:
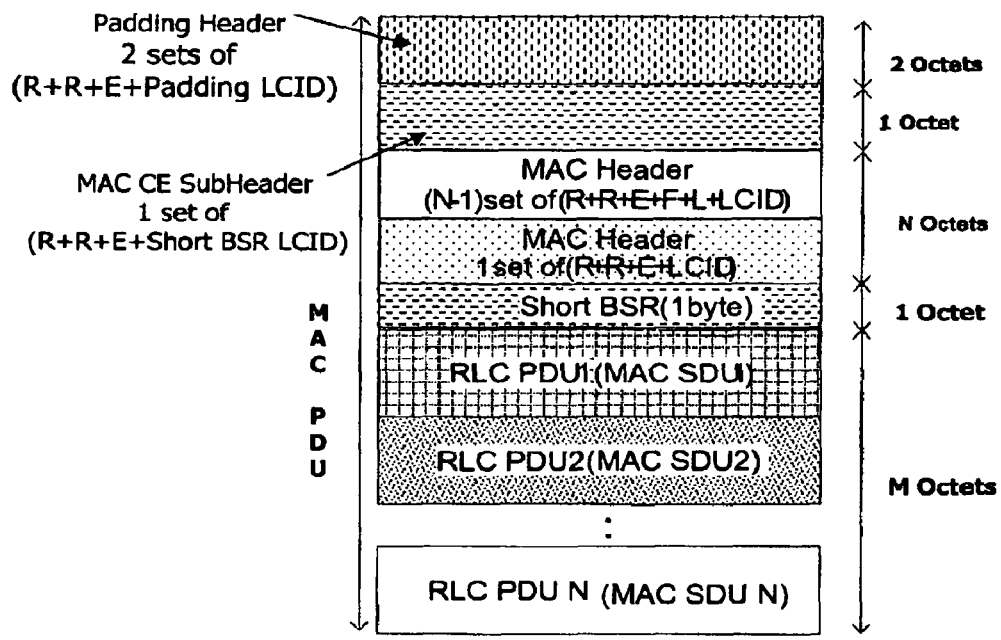
FIG. 14 shows two more exemplary implementations of constructing a MAC PDU having BSR included therein.
Figure 14:
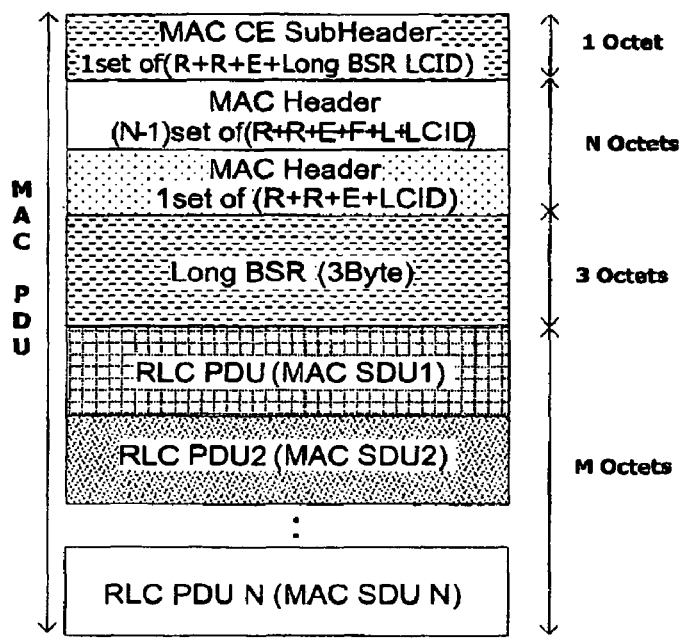
Figure 15:
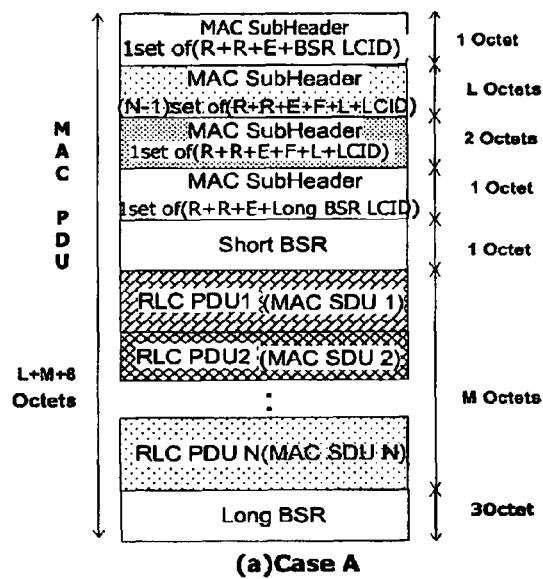
FIG. 15 shows three more exemplary implementations of constructing a MAC PDU having BSR included therein.
Figure 15:
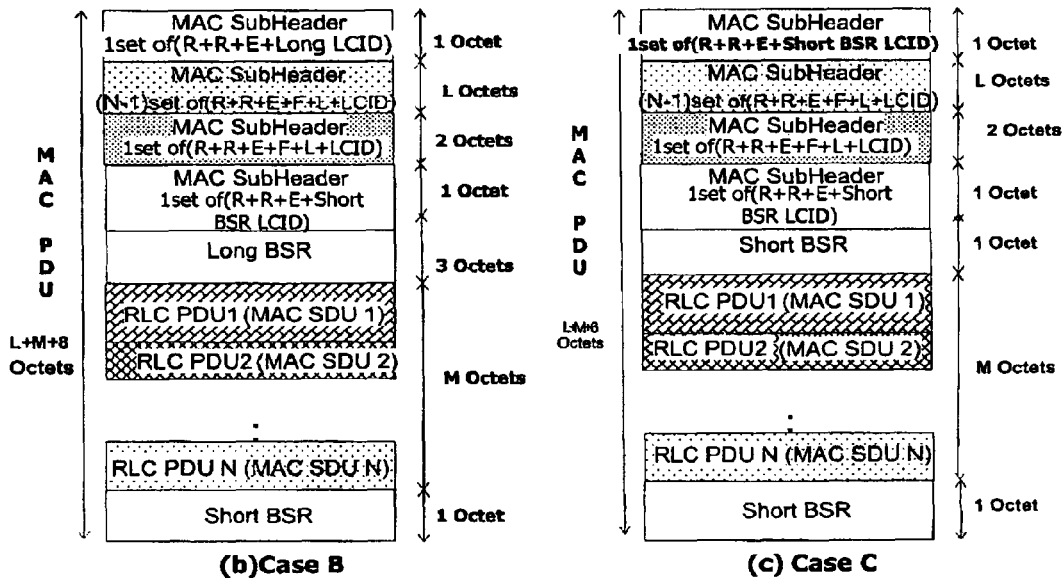

Referring to FIG. 14 having drawings (a) and (b) and FIG. 15 having drawings (a), (b) and (c), when constructing the MAC PDU, the MAC entity in the transmitter (sending side) the MAC PDUs are filled with the data from each logical channel and the MAC CEs, then if 2 bytes of remaining space are in the MAC PDU, and if a Short BSR is already included in the MAC PDU, the present invention proposes that the Short BSR be replaced with a Long BSR. Thus, the Long BSR is included in the MAC PDU instead of the Short BSR, as shown in FIG. 14.

Also, when constructing the MAC PDU, the MAC entity in the transmitter (sending side) the MAC PDUs are filled with the data from each logical channel and the MAC CEs, then if 4 bytes of remaining space are in the MAC PDU, such is used for the padding BSR, and particularly, the Long BSR is used. Here, the 4 bytes are comprised of a 1-byte MAC sub-header, a 1-byte Short BSR, and 2 bytes used for padding.

When constructing the MAC PDU, the MAC entity of the transmitter (sending side) fills the MAC PDU with data from each logical channel and MAC CEs, if the MAC PDU already includes a BSR, then one or more additional BSRs may also be inserted into the MAC PDU if there is any remaining space in the MAC PDU.

Also, when constructing the MAC PDU, the MAC entity of the transmitter (sending side) fills the MAC PDU with data from each logical channel and MAC CEs, if the MAC PDU already includes a BSR, and if there is any remaining space, the Padding BSR is not triggered.

Additionally, when constructing the MAC PDU, the MAC entity of the transmitter (sending side) fills the MAC PDU with data from each logical channel and MAC CEs, if there is any remaining space, and if a Periodic BSR or a Regular BSR has been triggered, then among the largest size Padding BSR and the BSRs that have been triggered, only the largest BSR thereof is inserted.

Furthermore, when constructing the MAC PDU, the MAC entity of the transmitter (sending side) fills the MAC PDU with data from each logical channel and MAC CEs, and if the Periodic BSR or the Regular BSR was triggered, then the Padding BSR will not be triggered.

As for the effects of the present invention, when the mobile terminal constructs a MAC PDU and if there is any space remaining in the MAC PDU, a method of effectively using such remaining space is provided in order to increase the usability and efficiency of radio resources.

Some more details about the concepts and features of the present invention will be explained as follows:
Details #1

The Padding BSR can be included at the other places (or positions) before last sub-headers of MAC. Namely, when the padding has a size of 2 bytes after filling the Transport Block (TB) with sub-headers and related MAC SDUs or other MAC control elements, a 2 byte short BSR is included. For example, the first sub-header can be a short BSR if it can exactly remove padding.

Namely, when the padding is of 2 byte length after filling the TB with sub-headers and related MAC SDUs or other MAC control elements, the last sub-header for MAC SDU can includes a 2 byte "L" field. Namely, the F field indicating a "long L" field and a "15 bit L field" are used. At each decoding of MAC sub-header, when the total sum of the size of sub-headers and the size of related MAC control elements or related MAC SDUs is exactly the same as the TB (assuming that the trailing 1~7 bit is excluded), the receiving MAC entity considers that there are no more sub-headers. This is not considered as an error case. Namely, the last MAC sub-header can include an "L" field, if it can exactly fit the TB without having padding byte/LCID.
Details #2

Padding occurs at the end of the MAC PDU, except when single-byte or two-byte padding is required but cannot be achieved by padding at the end of the MAC PDU.

When single-byte or two-byte padding is required but cannot be achieved by padding at the end of the MAC PDU, one or two MAC PDU sub-headers corresponding to padding are inserted before the first MAC PDU sub-header corresponding to a MAC SDU; or if such sub-header is not present, before the last MAC PDU sub-header corresponding to a MAC control element.

For FDD, when, due to the quantization in the transport block sizes that can be supported or triggering of the Scheduling Information, the size of the data plus header is less than or equal to the TB size of the E-TFC selected by the UE minus 24 bits, the DDI value [111111] shall be appended at the end of the MAC-e header and a Scheduling Information shall be concatenated into this MAC-e PDU, where DDI value [111111] indicates that there is a Scheduling Information concatenated in this MAC-e PDU. Otherwise, if the size of the data plus header is less than or equal to the TB size of the E-TFC selected by the UE minus 18 bits, a Scheduling Information shall be concatenated into this MAC-e PDU. In any other case it is understood that another MAC-es PDU or Scheduling Information does not fit and it is therefore not necessary to reserve room in the transport block for an additional DDI field.

Namely, in case of HSUPA, to decide what to include or when to stop filling the MAC TB, the transmitter continuously compares the size of MAC header plus MAC data with the available transport block size. So, in some cases, scheduling information is added without any field indicating the existence of scheduling information. Thus, some header fields such as DDI can be omitted to increase efficiency.

But, the current LTE MAC specification does not describe this kind of operation. Thus, the question arises as to whether the operation of HSUPA is forbidden or not. The case is shown in FIG. 13.

In (a), the remaining two bytes are used up by including 2 padding sub-header. In (b), the two bytes are replaced by "F" and "L" fields. Accordingly, the last sub-header also includes "F" and "L" fields. This is the similar approach taken in HSUPA. Namely, by comparing the total sum of sub-headers plus the data field with size of Transport Block (TB), the receivers can know that there is no padding. In (c), the two bytes are replaced by a Short BSR. In fact, the short BSR may not be an empty buffer status report. The useful scenario for (c) is shown in FIG. 16.

Figure 16:
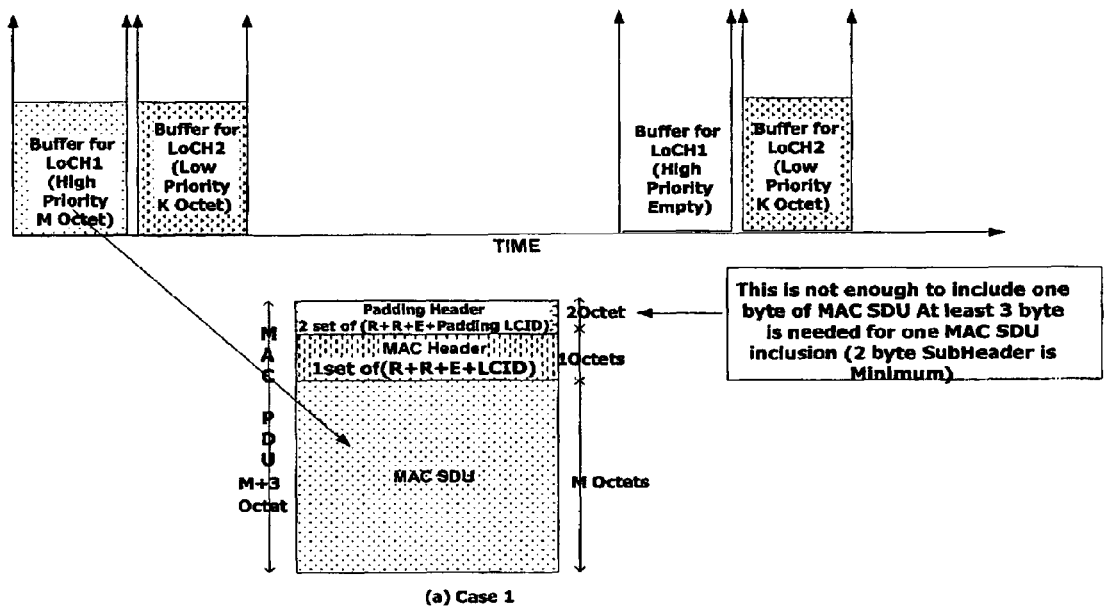
FIG. 16 shows that the existence of padding LCID does not discriminate whether there is still a data in the UE's buffer, and to assist efficiency of the eNB scheduler, rather than wasting 2 bytes by Padding LCID, it would be more useful to use those 2 bytes for short BSR.

As shown in FIG. 16, the existence of padding LCID does not discriminate whether there is still a data in the UE's buffer. To assist efficiently eNB scheduler, it is believed that approach (c) in FIG. 13 is better than the approach (a). Namely, rather than wasting 2 bytes by Padding LCID, it would be more useful to use those 2 bytes for short BSR.

Referring back to FIGS. 4 through 6, an explanation of the MAC PDU (DL-SCH and UL-SCH) will be provided.

A MAC PDU consists of a MAC header, zero or more MAC Service Data Units (MAC SDU), zero, or more MAC control elements, and optionally padding; as described in FIG. 4. Both the MAC header and the MAC SDUs are of variable sizes. A MAC PDU header consists of one or more MAC PDU sub-headers; each sub-header corresponding to either a MAC SDU, a MAC control element or padding. In some embodiments, the MAC PDU sub-headers for padding should not occur more than once in the MAC PDU.

A MAC PDU sub-header may consist of six header fields R/R/E/LCID/F/L, but for the last sub-header in the MAC PDU and for fixed sized MAC control elements. The last sub-header in the MAC PDU and sub-headers for fixed sized MAC control elements consist solely of the four header fields R/R/E/LCID. It follows that a MAC PDU sub-header corresponding to padding consists of the four header fields R/R/E/LCID.

MAC PDU sub-headers have the same order as the corresponding MAC SDUs, MAC control elements and padding. MAC control elements, except Padding BSR, are always placed before any MAC SDU. Padding BSR occurs at the end of the MAC PDU. Padding occurs at the end of the MAC PDU, except when single-byte is required but cannot be achieved by padding at the end of the MAC PDU. When single-byte is required but cannot be achieved by padding at the end of the MAC PDU, one MAC PDU sub-headers corresponding to padding are inserted before the first MAC PDU sub-header corresponding to a MAC SDU; or if such sub-header is not present, before the last MAC PDU sub-header corresponding to a MAC control element. When two bytes remain after filling the MAC PDU with MAC SDUs or MAC control elements (except the BSR), then the short BSR is included.

In some embodiments, a maximum of one MAC PDU can be transmitted per TB per UE. Also, depending on the physical layer category, one or two TBs can be transmitted per TTI per UE.

It should be noted that it is FFS whether this MAC PDU applies only to DL/UL SCH or also to other transport channels.

Details #3

Padding BSR is included when there is some remaining space in the MAC PDU that is equal to or larger than the size of the BSR. If uplink (UL) resources are allocated and the number of padding bits is larger than the size of the Buffer Status Report MAC control element, such BSR is referred below to as "Padding BSR." But, regarding how to express the Padding BSR, the following issues need to be addressed: MAC control elements (except Padding BSR) are always placed before any MAC SDU. Padding BSR occurs at the end of the MAC PDU and Padding occurs at the end of the MAC PDU, except when single-byte or two-byte padding is required but cannot be achieved by padding at the end of the MAC PDU. Both Padding BSR and Padding may occur at the end of the MAC PDU. However, whether padding BSR is indicated explicitly by BSR LCID or implicitly by Padding LCID or whether Padding BSR follows Padding or Padding follows Padding BSR are some of the issued that are resolved by the present invention.

How to Indicate Padding BSR (4 Proposals)

Figure 17:
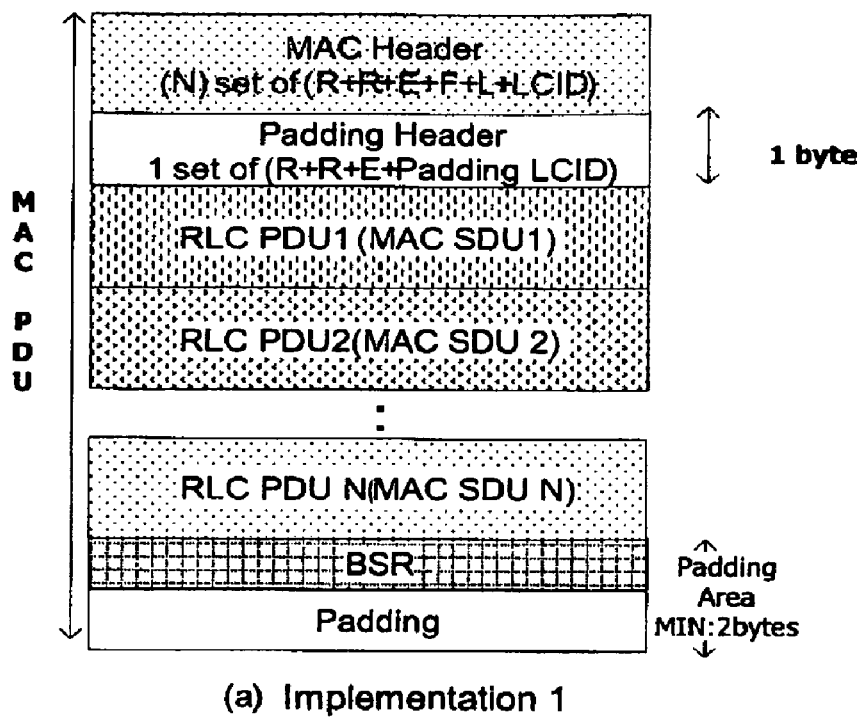
FIG. 17 shows two possible implementations (a) and (b) on how to indicate the existence of Padding BSR.
Figure 17:
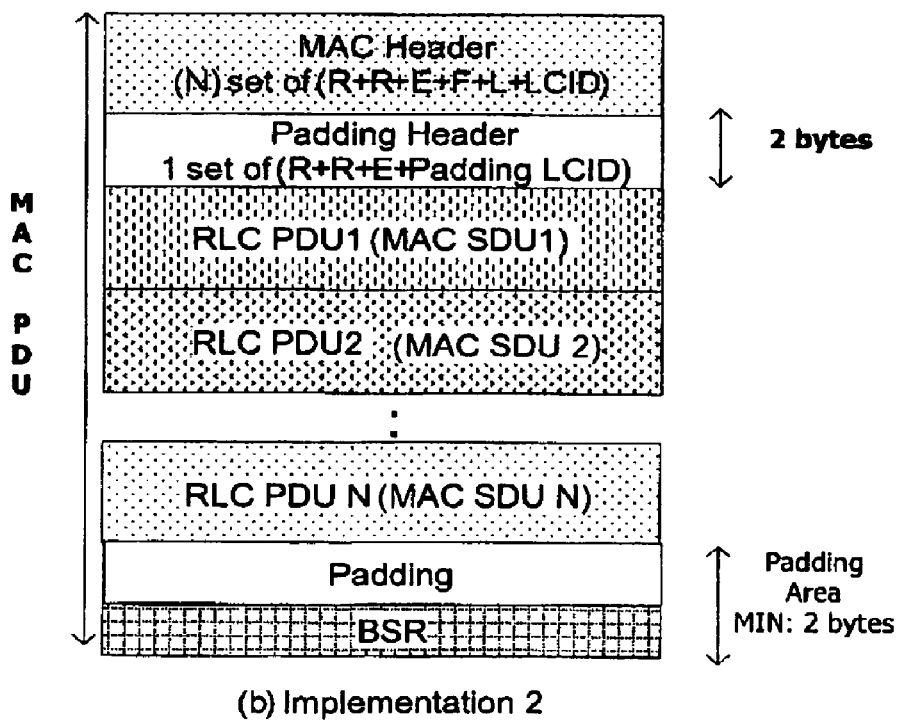

FIG. 17 shows two possible implementations (see drawings (a) and (b)) on how to indicate the existence of Padding BSR.

In (a), depending on the size of padding area, either short BSR or long BSR is included without having a related Sub Header. In (a), BSR can be included whenever the size of padding is equal to or larger than 2 bytes. In this approach, if 3 bytes remain after filling the MAC PDU with other Sub Header(s) or MAC SDU/CE, then the BSR can be included.

In (b), the last 2 MAC Sub Headers are BSR Sub Header and Padding

Sub Header, whereby Padding BSR is indicated explicitly. In this approach (b), when 4 bytes remain after filling the MAC PDU with other Sub Header(s) or MAC SDU/CE, then the BSR can be included.

Namely, the difference between the two approaches (a) and (b) is what the minimum size of remaining bytes to include BSR is.

Proposal 1

It is proposed to decide whether to use implicit or explicit method to indicate Padding BSR, and the order between Padding BSR and Padding is considered.

FIG. 17 shows two possible implementations about the location of Padding BSR in case that implicit indication is used as in (a) of FIG. 12. Either approach is workable. In FIG. 17, is can be understood that the BSR may be placed before or after the byte used for padding.

Figure 18:
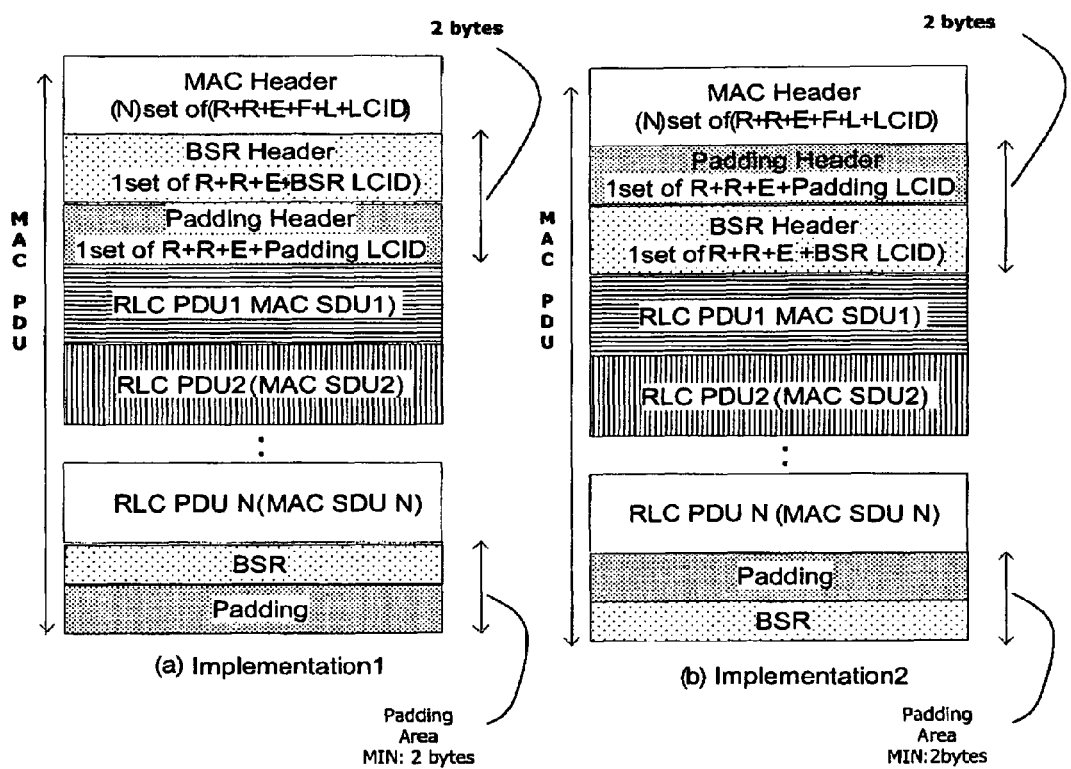
FIG. 18 shows two possible implementations on the location of Padding BSR in case that explicit indication is used.

FIG. 18 shows two possible implementations on the location of Padding BSR in case that explicit indication is used as in (b) of FIG. 12. Both solutions are based on the "E" field. If the "E" field indicates another MAC Sub Header, the receiver just decodes next byte to know what is following. But, in approach (b), upon detection of BSR LCID after Padding LCID, the MAC receiver in eNB can immediately decode the last bytes to know the UE's buffer status. On the other hand, in approach (a), upon detection of BSR LCID, the MAC receiver in eNB first has to calculate the starting position of BSR before decoding the first byte of BSR.

Proposal 2

It is proposed to decide whether Padding BSR is last or Padding is last in a MAC PDU.

Proposal 3

When 2 byte remains after filling MAC PDU with MAC SDUs or MAC CEs except BSR, it should is used to deliver short BSR.

Figure 19:
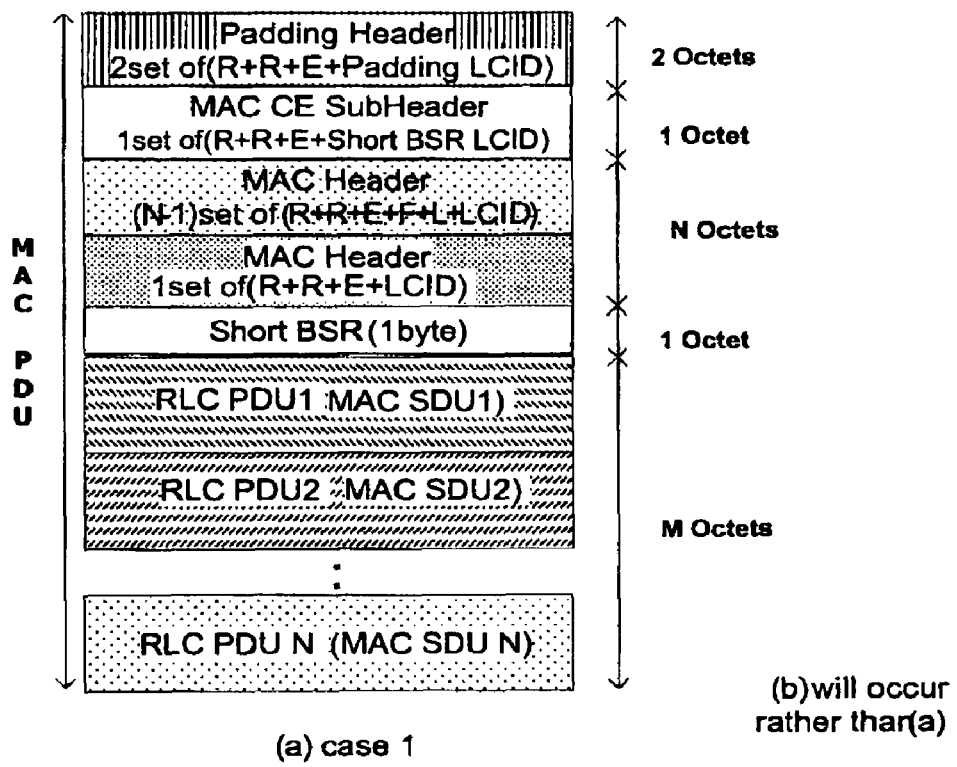
FIG. 19 shows the case where 2 bytes remain after short BSR is already included into a MAC PDU, thus long BSR should have been used instead of short BSR.
Figure 19:
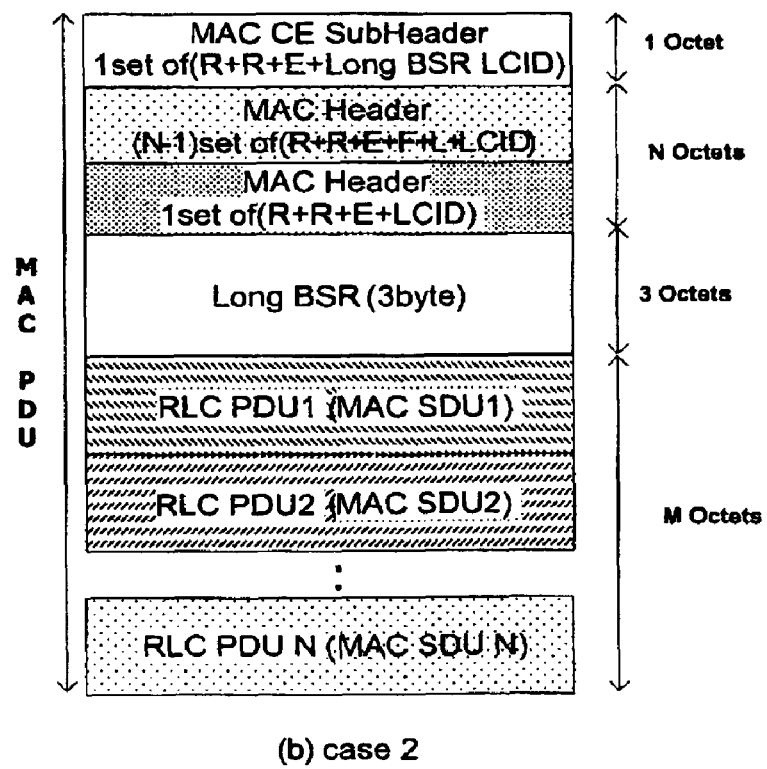
Figure 20:
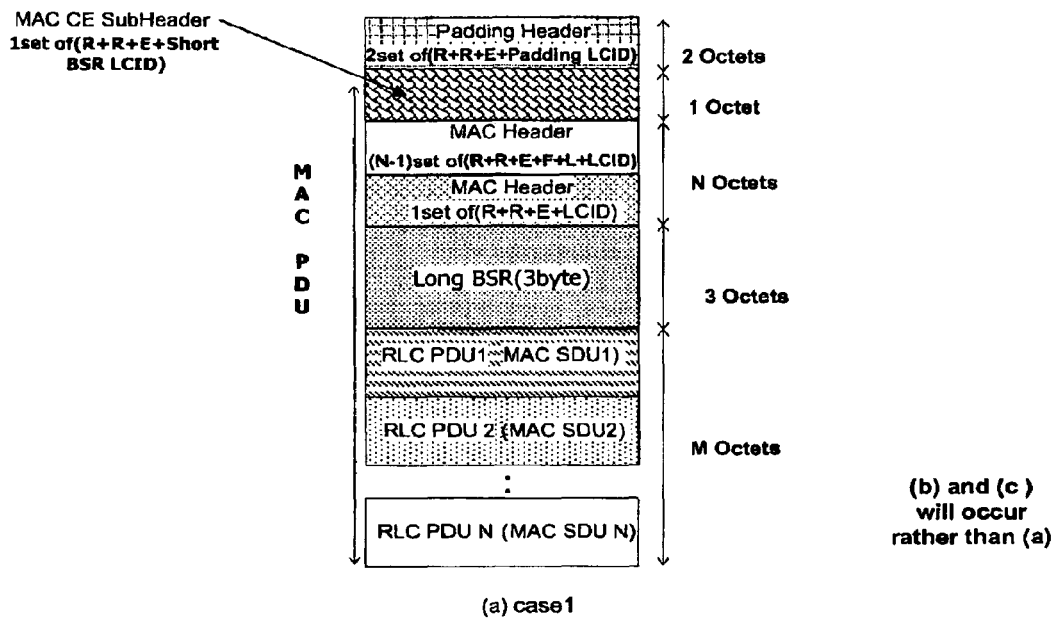
FIG. 20 shows the case where 2 bytes remain after Long BSR has been included.
Figure 20:
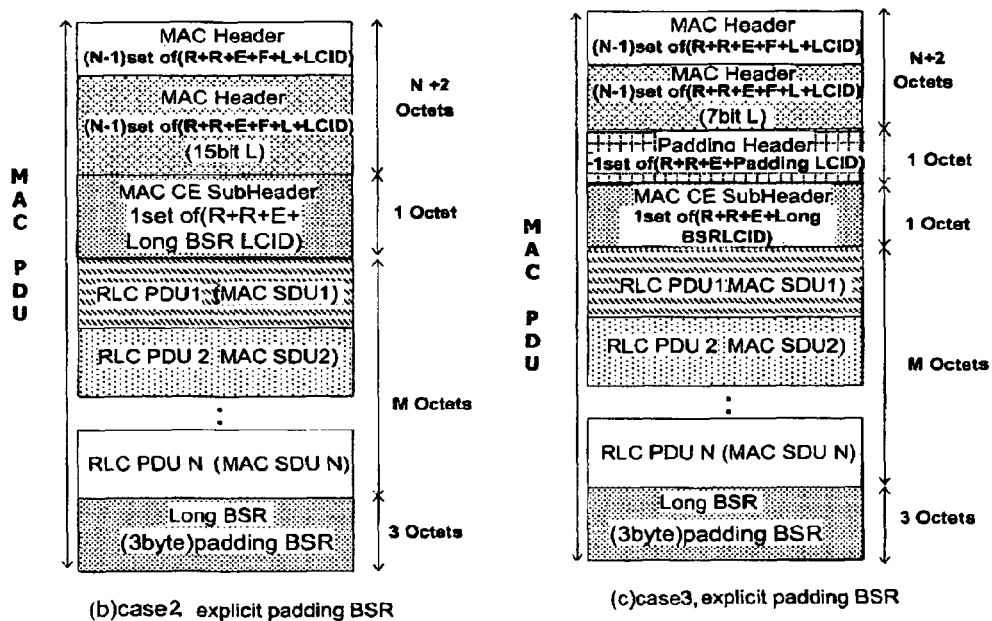

Meanwhile, if two bytes remain after the BSR is already included in the MAC PDU, the situations in FIG. 19 (case of 2 remaining bytes after short BSR is included) and in FIG. 20 (case of 2 remaining bytes after long BSR is included, in case explicit Padding BSR indication) can be considered.

FIG. 19 drawing (a) shows the case where 2 bytes remain after short BSR is already included into a MAC PDU. This case means that 4 bytes originally remained in MAC PDU after filling data only from each logical channel. In other words, 4 bytes were available after filling the MAC PDU with RLC PDUs before including the short BSR. Regardless of whether there was further data in the RLC entities, the 4 bytes were initially padding bytes. Then, long BSR should have been included rather than the short BSR. Thus, (b) should be used than (a).

FIG. 20 drawing (a) shows the case where 2 bytes remain after Long BSR has been included. It means that 6 bytes originally remained in MAC PDU after filling data from each logical channel. In other words, 6 bytes were available after filling the MAC PDU with only RLC PDUs from upper layer. There are three scenarios for this:

1. If there was no remaining data in every RLC entities, the 6 bytes were initially padding bytes, the BSR should have been cancelled or normal padding BSR must have been included. In this case, if explicit indication is used for padding BSR, (b) and (c) in FIG. 4 will occur rather than (a). If implicit indication is used for padding BSR, (b) and (c) in FIG. 5 will occur rather than (a).

2. If there was only one logical channel with data after filling MAC PDU, short BSR must have been triggered and the remaining 4 bytes must have been used to include data for the logical channel.

Figure 21:
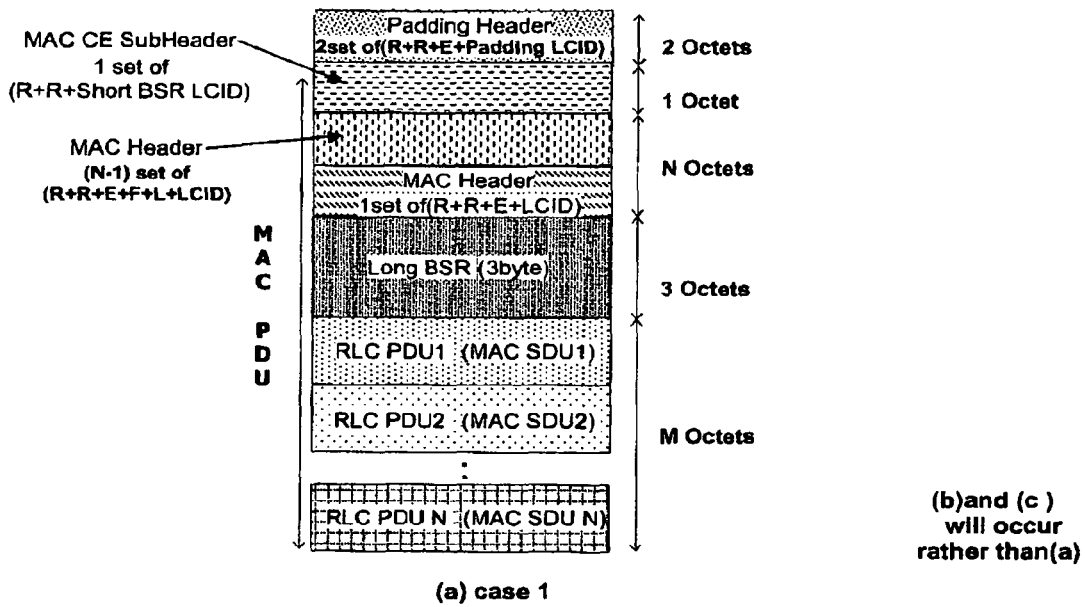
FIG. 21 shows the case where 2 remaining bytes after Long BSR is included, in case of implicit Padding BSR indication.
Figure 21:
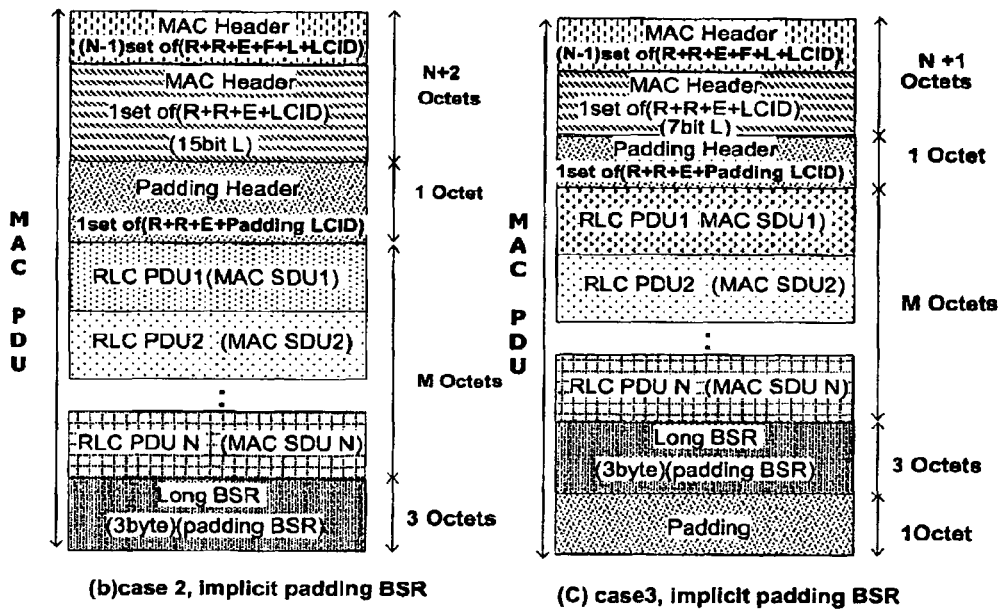

3. If there were more than one logical channel with data after filling the MAC PDU, long BSR should be included anyway. But this situation seems weird, because (b) and (c) in FIG. 20 will occur in case explicit indication is used for padding BSR. And (b) and (c) in FIG. 21 (Case of 2 remaining bytes after Long BSR is included, in case implicit Padding BSR indication) will occur in case implicit indication is used for padding BSR.

Accordingly, the two-byte padding Sub Header case may not be obvious and maybe not always useful. And because current MAC structure can avoid two-byte padding, two-byte padding Sub Header should not exist.

Proposal 4

Two-byte padding Sub Header inside MAC Header should be avoided.

Details #4

For the network, certain concepts of the present invention may be described in the following manner:

eNB composes MAC PDU using available data in RLC/PDCP buffers for one UE and additionally using MAC Control Elements.

After filling MAC PDU with MAC SDUs/MAC CEs:
if two bytes remains after filling MAC PDU,
the eNB includes Timing Alignment Command (TA CMD) into the MAC PDU, replacing the two bytes.
in this case, one byte is used to include subheader for TA CMD and
one byte is used to include actual value of timing command.
if more than two bytes remains after filling MAC PDU,
the eNB includes TA CMD into the MAC PDU, replacing at least the two bytes.
in this case, one byte is used to include subheader for TA CMD and
one byte is used to include actual value of timing command.
and at least one byte is used as subheader for padding.
Or, if more than two bytes remains after filling MAC PDU,
the eNB includes TA CMD into the MAC PDU, replacing at least the two bytes.
in this case, one byte is used to include actual value of timing command.
and one byte is used as subheader for padding.
and other bytes are used as padding.
Or, one byte of padding is replaced by TA CMD.

For the mobile terminal, certain concepts of the present invention may be described in the following manner:
a UE decodes/reassembles a received MAC PDU into MAC SDUs and/or MAC CEs.
a UE decodes each MAC SubHeader and the MAC SDUs/CEs associated with the SubHeader
a UE calculates the size sum of subheaders and MAC SDUs/CEs
a UE compares the size sum with the MAC PDU size
if the padding is indicated and the size of padding (except padding subheader) is equal to or large than 1-bytes,
the UE considers that a TA CMD is included in the padding part.

Details #5

For the uplink direction, the current MAC specification mandates that UE shall include BSR if padding space allows the inclusion of BSR. Considering that two bytes are required to include a short BSR, a BSR will be included in a MAC PDU whenever the remaining padding space is two-bytes.

Figure 22:
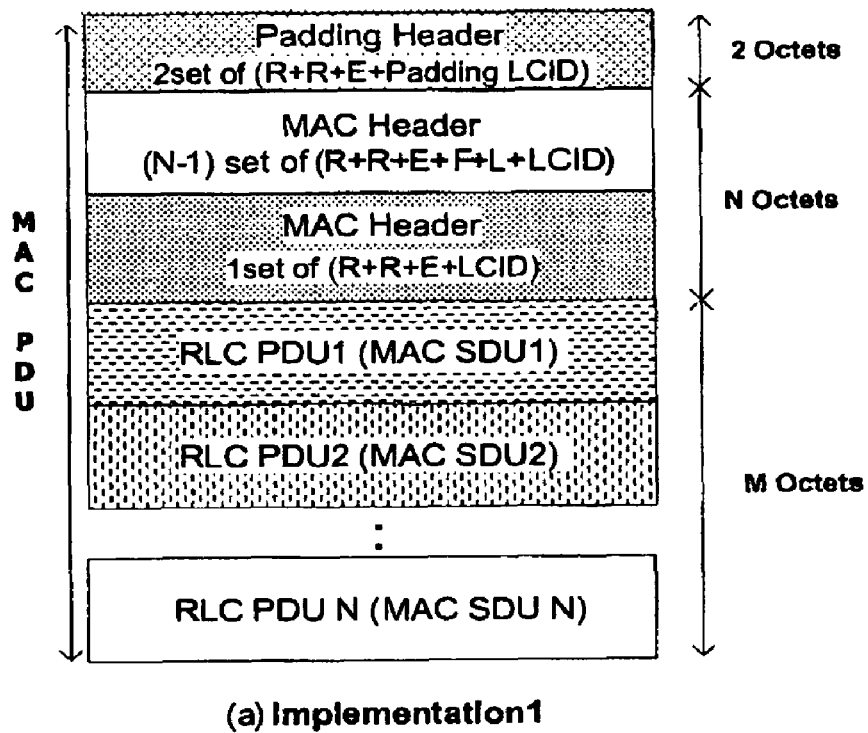
FIG. 22 shows that because 2 bytes are enough for the inclusion of short BSR, the format of (b) should be used instead of the format of (a).
Figure 22:
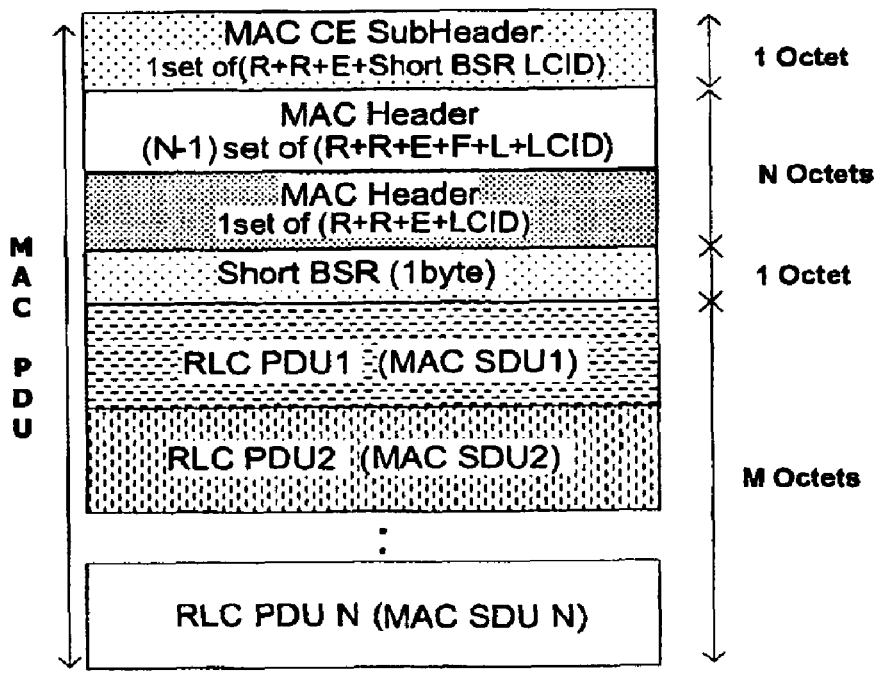

In FIG. 22, because 2 bytes are enough for the inclusion of short BSR, the situation of drawing (a) should not occur. If we follow the intention of current specification, UE should send the format of drawing (b) of FIG. 22.

Thus, the special handing of two-byte padding according to the following is not needed:

Padding occurs at the end of the MAC PDU, except when single-byte or two-byte padding is required but cannot be achieved by padding at the end of the MAC PDU. When single-byte or two-byte padding is required but cannot be achieved by padding at the end of the MAC PDU, one or two MAC PDU sub-headers corresponding to padding are inserted before the first MAC PDU sub-header corresponding to a MAC SDU; or if such sub-header is not present, before the last MAC PDU sub-header corresponding to a MAC control element.

By the way, BSR in drawing (b) of FIG. 22 can be called a Padding BSR, because it is included due to the padding space. Because the BSR is not located at the end of MAC PDU, one may argue that this is inconsistent with current definition of padding BSR. However, the padding BSR need not be the last element in MAC PDU. Furthermore, padding BSR is indicated with explicit LCID. Thus, the padding BSR can be located anywhere within the MAC PDU.

In the downlink direction, there is no need for BSR, the situation in DL is different from UL. Thus, special handling of 2 byte padding is still required in DL direction. Because the size of Timing Advance Command is 2 byte, one can argue that TA CMD can be included whenever 2 byte remains in MAC PDU. Sending more TA CMD is beneficial because it can keep UE longer in synchronized state, but this restricts eNB's behaviour unnecessarily.

Figure 23:
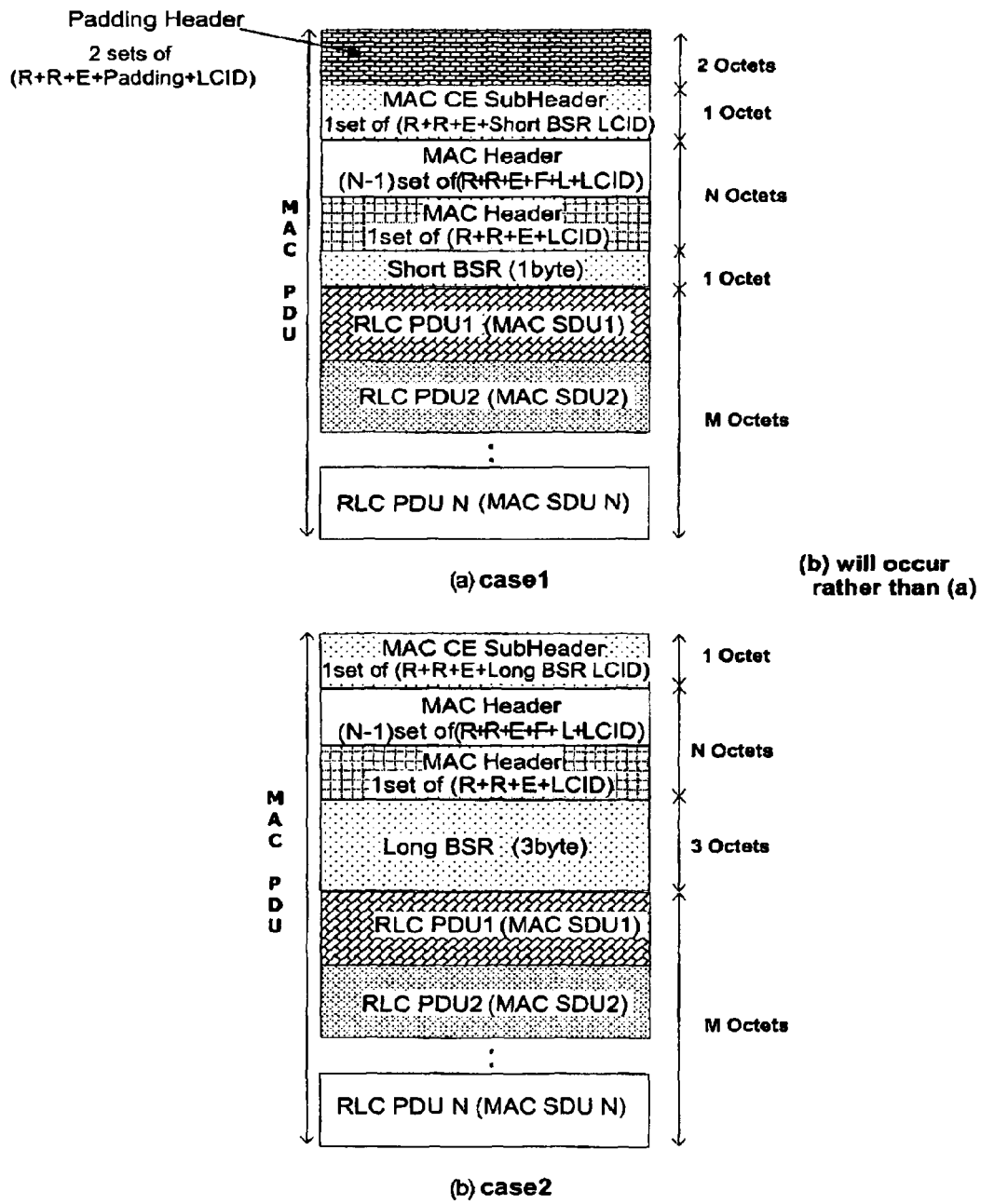
FIG. 23 shows the case where 2 bytes remain for a MAC PDU which already included a short BSR.
Figure 24:
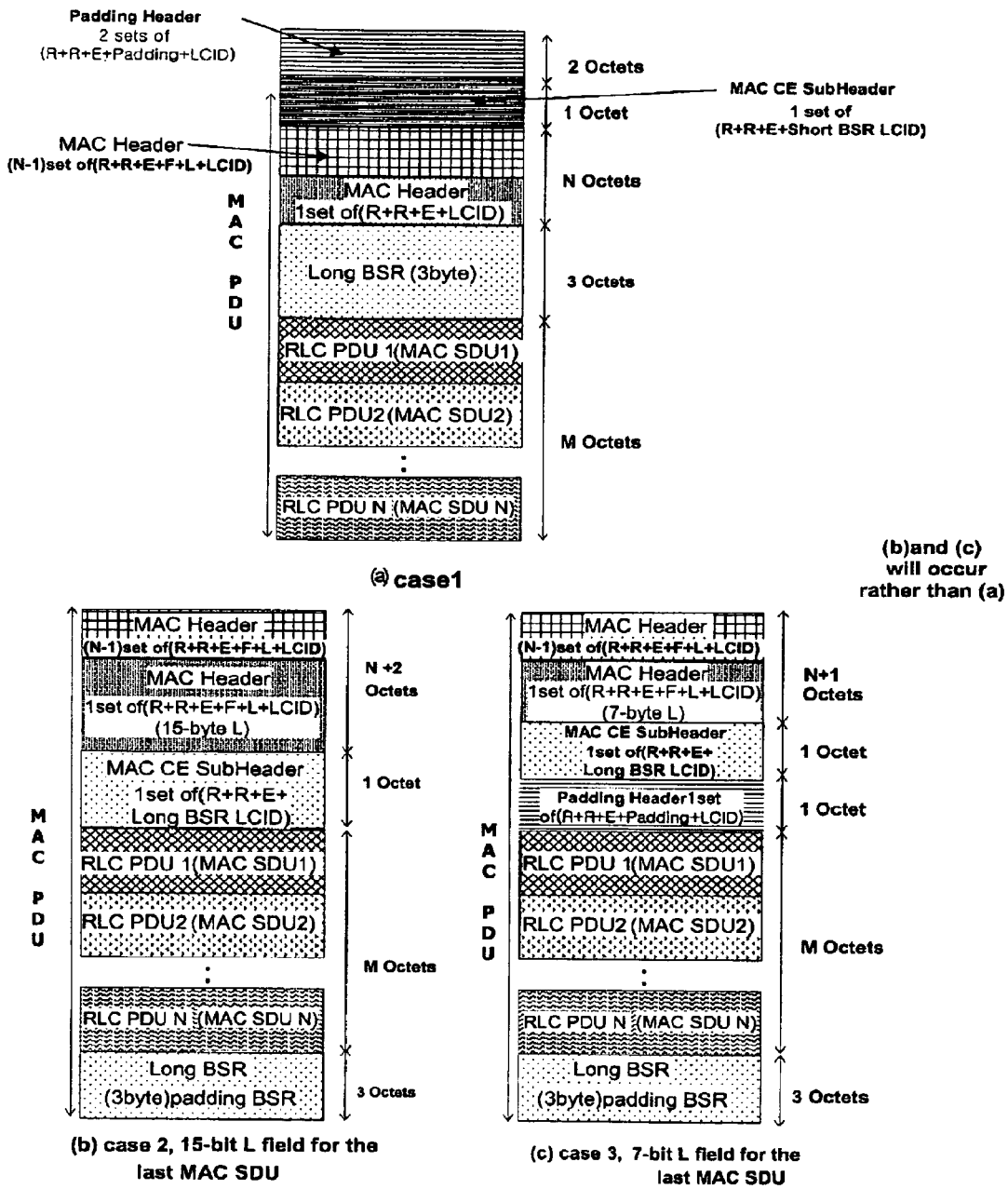
FIG. 24 shows the case where 2 bytes remain for a MAC PDU which already included a long BSR.

Regarding further analysis, to be on the safe side, we also have to consider the case where 2 bytes remain for a MAC PDU which already included a BSR. This is shown in the following FIG. 23 for short BSR and FIG. 24 for long BSR.

Namely, if 2 bytes remain for a PDU which already included short BSR, it means that 4 bytes are available for a BSR. Then, short BSR will be replaced with long BSR. Thus, drawing (b) should occur rather than drawing (a) in FIG. 23.

Namely, if 2 bytes remain for a PDU which already included long BSR, it means that 6 bytes are available for a BSR. Then, 4 bytes will be used for long BSR and other 2 bytes can used for the L field for the last MAC SDU or Padding LCID. Thus, the format in drawings (b) or (c) should be used rather than the format in drawing (a) of FIG. 24.

Details #6

Features of the present invention may also be expressed as follows:

For padding BSR:
if the number of padding bits is equal to or larger than the size of the Short BSR but smaller than the size of the Long BSR, report Short BSR of the LCG with the highest priority logical channel with buffered data;

else, if the number of padding bits is equal to or larger than the size of the Long BSR, report Long BSR.

Location of Padding BSR

The BSR in drawing (b) of FIG. 22 is Padding BSR because it is included due to the padding space. But, due to the fact that the BSR is not located at the end of MAC PDU, one may argue that this is inconsistent with current definition of padding BSR. However, the padding BSR need not be the last element in MAC PDU. Furthermore, padding BSR is indicated with explicit LCID. Thus, the padding BSR can be located anywhere within the MAC PDU.

Figure 25:
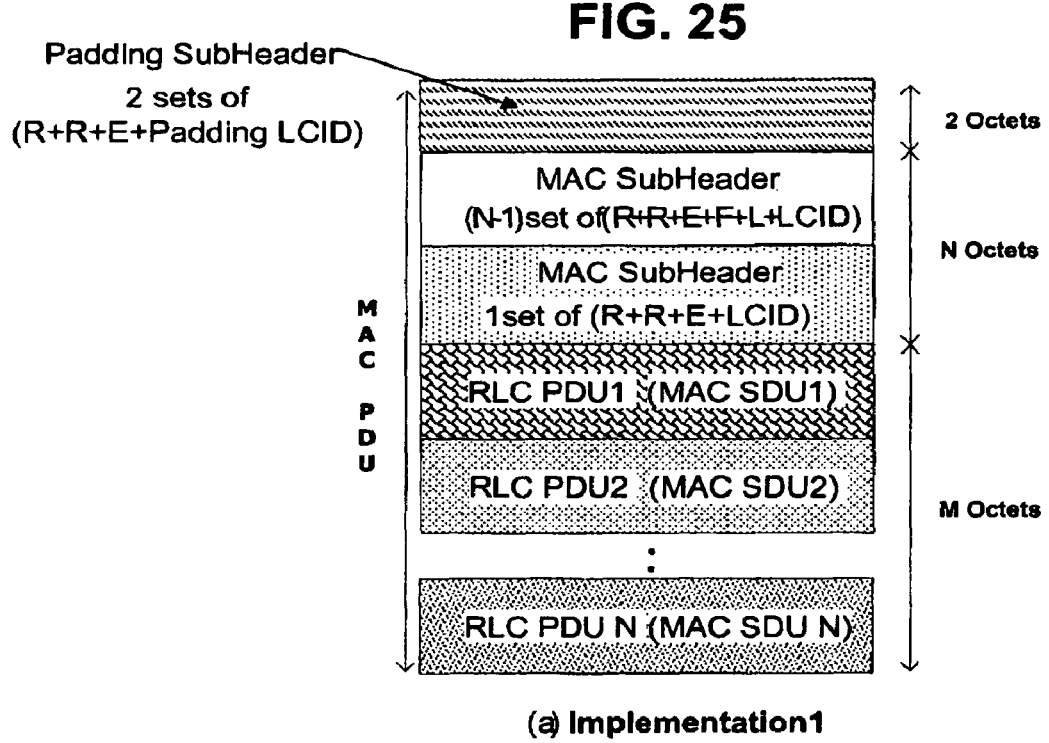
FIG. 25 shows a use case of a 2 byte remaining space of TB (Padding BSR is the last one).
Figure 25:
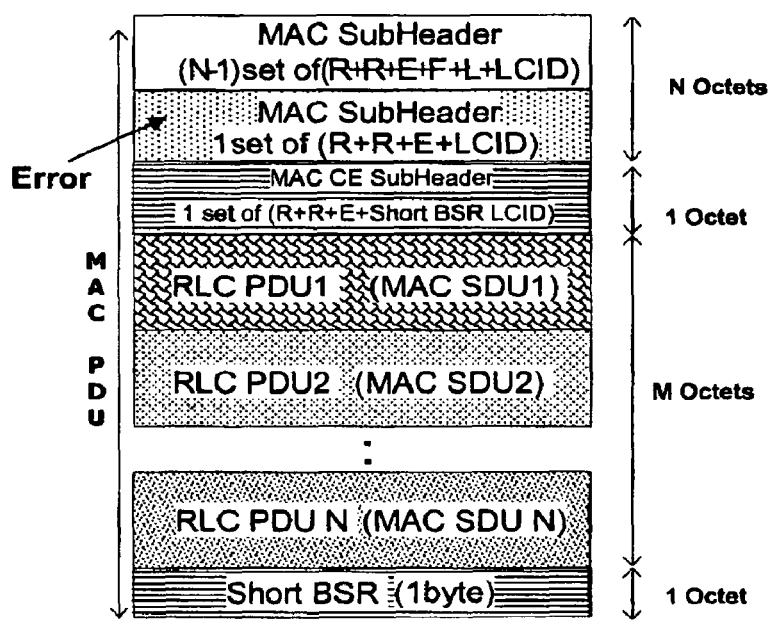

FIG. 25 shows a use case of 2 byte remaining space of TB (Padding BSR is the last one).

If we still mandate that padding BSR should be the last element except padding in a MAC PDU, it means (b) of FIG. 25 should be used.

In (b) of FIG. 25, the second MAC SubHeader does not have "L" field. But, because it is not the last MAC SubHeader in the MAC PDU, (b) in FIG. 25 may be incorrect.

It is clear that having a BSR is better than not having a BSR. Thus, (b) of FIG. 22 should be used than (a) or (b) of FIG. 25. As such, the location of BSR within a MAC PDU should not be restricted.

MAC control elements (except Padding BSR) are always placed before any MAC SDU. Padding BSR occurs at the end of the MAC PDU.

A MAC PDU sub-header consists of the six header fields R/R/E/LCID/F/L but for the last sub-header in the MAC PDU and for fixed sized MAC control elements. The last sub-header in the MAC PDU and sub-headers for fixed sized MAC control elements consist solely of the four header fields R/R/E/LCID. It follows that a MAC PDU sub-header corresponding to padding consists of the four header fields R/R/E/LCID.

It is clear that having a BSR is better than not having a BSR. In this sense, (b) of FIG. 22 should be used instead of (a) or (b) of FIG. 25. One way to avoid (b) of FIG. 25 is to allow for Padding BSR to be placed in any place within a MAC PDU. If this is allowed, the triggering condition of Padding BSR will guarantee that (b) of FIG. 22 is sent whenever 2 byte padding space is available.

A MAC PDU is a bit string that is byte aligned (i.e. multiple of 8 bits) in length. The bit strings can be represented by a table (or list) in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte aligned (i.e. multiple of 8 bits) in length. An SDU is included into a MAC PDU from the first bit onward.

MAC PDU sub-headers have the same order as the corresponding MAC SDUs, MAC control elements and padding.

MAC control elements, except Padding BSR, are always placed before any MAC SDU. Padding BSR can be placed either before any MAC SDU or after any MAC SDU.

In the uplink direction, padding occurs at the end of the MAC PDU, except when single-byte is required but cannot be achieved by padding at the end of the MAC PDU.

In the downlink direction, padding occurs at the end of the MAC PDU, except when single-byte or two-byte padding is required but cannot be achieved by padding at the end of the MAC PDU.

In the uplink direction, when single-byte padding is required but cannot be achieved by padding at the end of the MAC PDU, one MAC PDU sub-headers corresponding to padding are inserted before the first MAC PDU sub-header corresponding to a MAC SDU; or if such sub-header is not present, before the last MAC PDU sub-header corresponding to a MAC control element.

In the downlink direction, when single-byte or two-byte padding is required but cannot be achieved by padding at the end of the MAC PDU, one or two MAC PDU sub-headers corresponding to padding are inserted before the first MAC PDU sub-header corresponding to a MAC SDU, or if such sub-header is not present, inserted before the last MAC PDU sub-header corresponding to a MAC control element.

A maximum of one MAC PDU can be transmitted per TB per UE. Depending on the physical layer category, one or two TBs can be transmitted per TTI per UE.

Details #7

A MAC PDU header consists of one or more MAC PDU sub-headers; each sub-header corresponding to either a MAC SDU, a MAC control element or padding. MAC PDU sub-headers for padding should not occur more than once in the MAC PDU.

MAC PDU sub-headers have the same order as the corresponding MAC SDUs, MAC control elements and padding.

MAC control elements, except Padding BSR, are always placed before any MAC SDU. Padding BSR occurs at the end of the MAC PDU.

Padding occurs at the end of the MAC PDU, except when single-byte is required but cannot be achieved by padding at the end of the MAC PDU.

When single-byte is required but cannot be achieved by padding at the end of the MAC PDU, one MAC PDU sub-headers corresponding to padding are inserted before the first MAC PDU sub-header corresponding to a MAC SDU; or if such sub-header is not present, before the last MAC PDU sub-header corresponding to a MAC control element.

When two bytes remain after filling the MAC PDU with MAC SDUs or MAC control elements (except BSR), a short BSR is included.

A maximum of one MAC PDU can be transmitted per TB per UE. Depending on the physical layer category, one or two TBs can be transmitted per TTI per UE.

Details #8

A MAC PDU sub-header consists of the six header fields R/R/E/LCID/F/L but for the last sub-header in the MAC PDU and for fixed sized MAC control elements. The last sub-header in the MAC PDU and sub-headers for fixed sized MAC control elements consist solely of the four header fields R/R/E/LCID. It follows that a MAC PDU sub-header corresponding to padding consists of the four header fields R/R/E/LCID.

The number of padding bits is equal to TB size minus the size of MAC SDUs or MAC CEs minus the size of their related MAC SubHeaders. In this calculation, the MAC SubHeader for the last MAC SDU is assumed to have "R/R/E/LCID/F/L".

MAC control elements, except Padding BSR, are always placed before any MAC SDU. Padding BSR can be place anywhere within the MAC PDU.

For padding BSR:
if the number of padding bits is equal to or larger than the size of the Long BSR and the Long BSR fits into the MAAC PDU, report Long BSR.
else, if the number of padding bits is equal to or larger than the size of the Short BSR and the Short BSR fits into the MAC PDU, report Short BSR of the LCG with the highest priority logical channel with buffered data.

Details #9

Two alternatives can be thought of:

Alternative 1

For padding BSR:

if the number of padding bits is equal to or larger than the size of the Short BSR but smaller than the size of the Long BSR, report Short BSR of the LCG with the highest priority logical channel with buffered data;

else if the number of padding bits is equal to or larger than the size of the Long BSR, report Long BSR.

The number of padding bits is equal to TB size minus the size of MAC SDUs or MAC CEs minus the size of their related MAC subheaders. In this calculation, if the last MAC subheader except padding was for a MAC SDU, the last MAC subheader is assumed to have "R/R/E/LC/LCID/F/L".

Alternative 2

For padding BSR:

if the number of padding bits is equal to or larger than the size of the Long BSR and if all the MAC subheaders for MAC SDUs within the MAC PDU can include F and L fields, report Long BSR.

else, if the number of padding bits is equal to or larger than the size of the Short BSR and if all the MAC subheaders for MAC SDUs within the MAC PDU can include F and L fields, report Short BSR of the LCG with the highest priority logical channel with buffered data.

Hereafter, a possible ambiguity problem and a solution thereof will be described.

Figure 26:
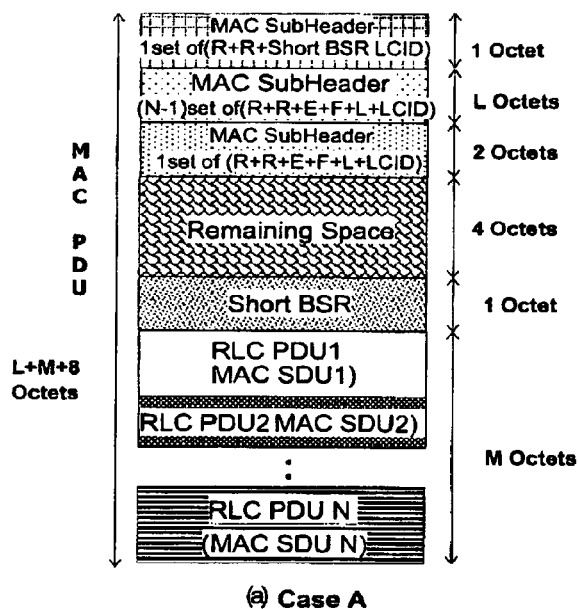
FIG. 26 shows that the remaining space is enough for the inclusion of long BSR, and different situations where multiple BSRs may be included in the MAC PDU.
Figure 26:
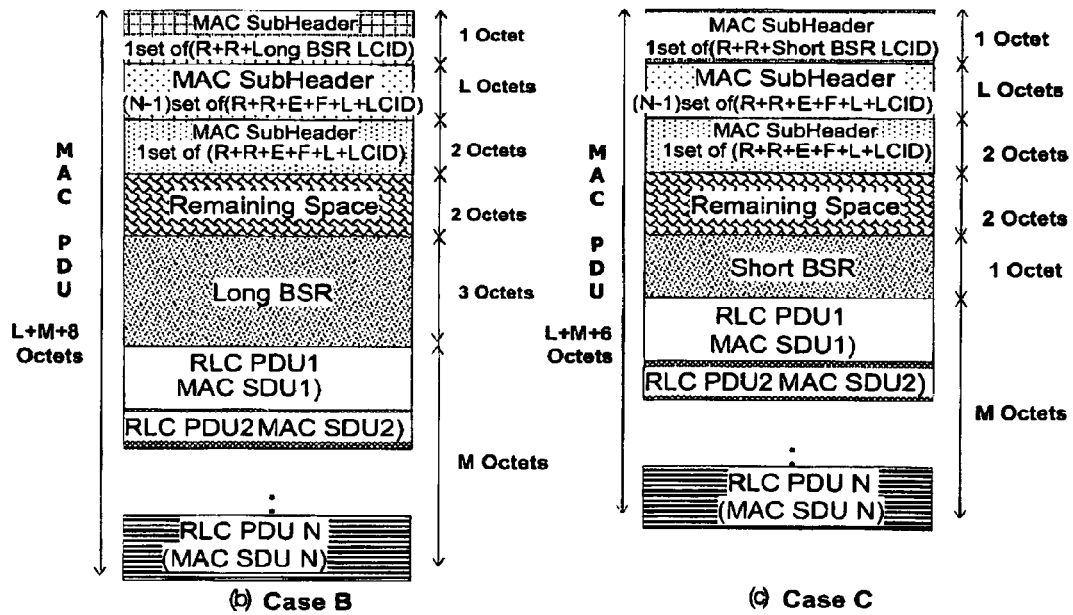

FIG. 26 drawing (a) shows the remaining space is enough for the inclusion of long BSR. But the MAC PDU already included short BSR. According to the current specification, only one BSR can be included into the MAC PDU when multiple BSR is triggered. Thus, either one of "Short" and "Regular" BSR or "Long" and "Padding" BSR is allowed in the FIG. 26. Similar problems are shown in (b) and (c) of FIG. 26.

Thus, it is unclear as to which one should be included. Namely, whether "Regular" or "Periodic" BSR has a higher priority than the "Padding" BSR. Perhaps a Long BSR should be chosen as much as possible. Or, perhaps the Short Regular BSR should be replaced by a Long Padding BSR. On the other hand, to ease the implementation complexity, it also can be proposed to allow multiple BSRs in one MAC PDU. This is another way to remove such ambiguity.

Figure 27:
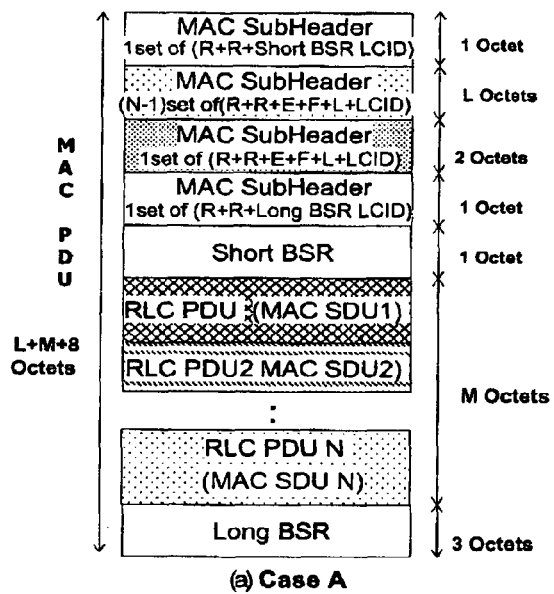
FIG. 27 shows multiple BSRs being included in one MAC PDU.
Figure 27:
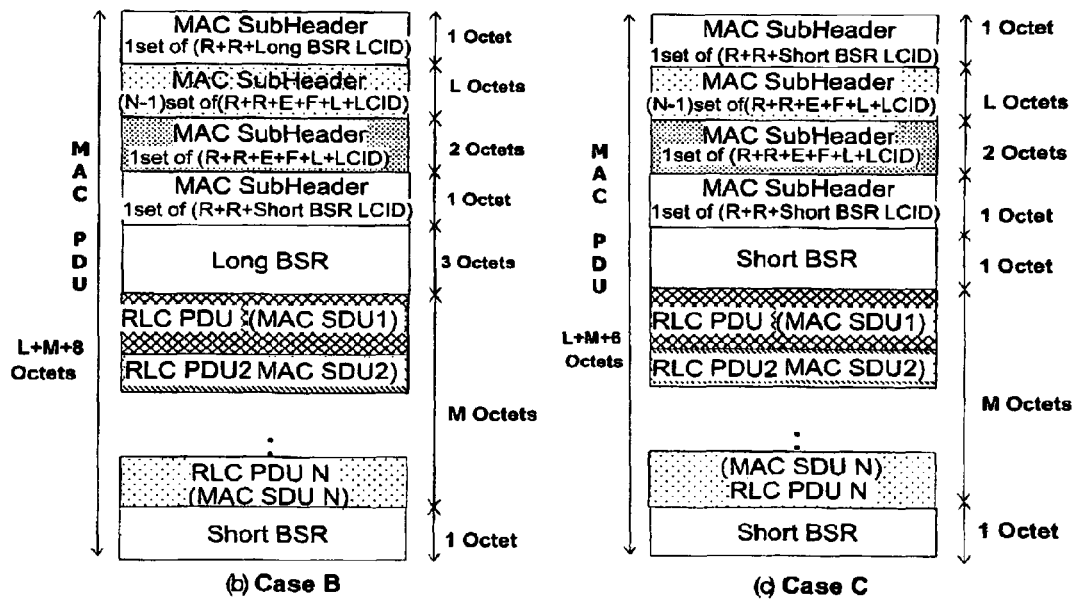

Thus, as one possible solution to the multiple BSR situations described above, multiple BSRs may be included in one MAC PDU, the format of FIG. 27 would replace that of FIG. 26.

Figure 28:
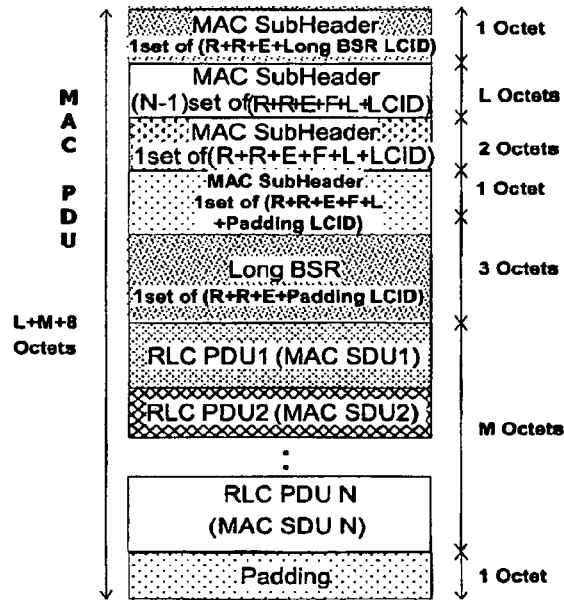
FIG. 28 shows the case of combining the remaining space and the already allocated space for "Regular" and "Periodic" BSR to include a long BSR.
Figure 28:
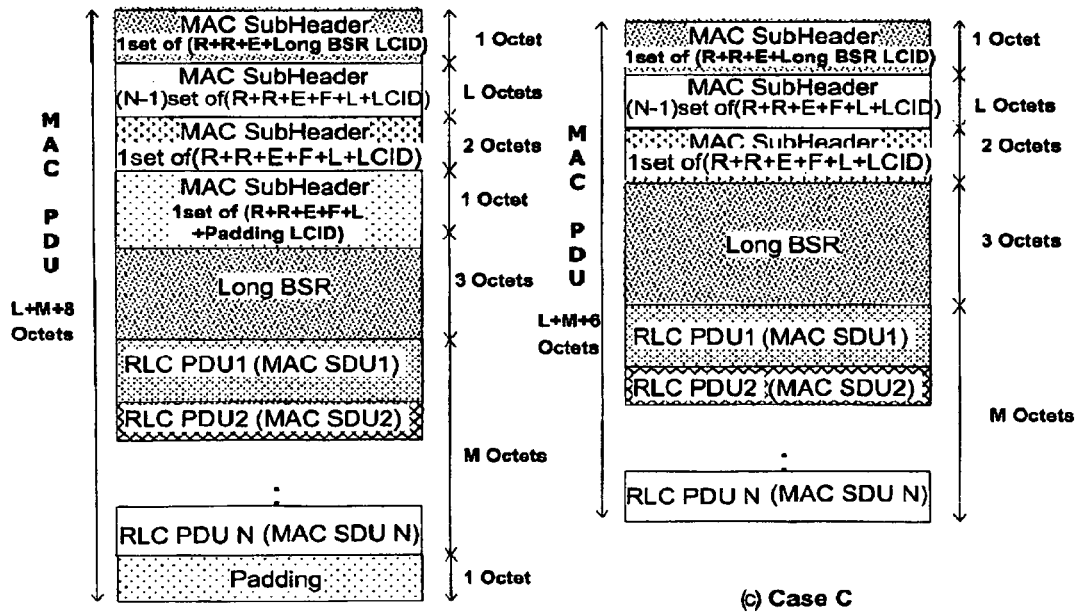

As another possible solution, the UE may include one Long BSR. Namely, when the UE composes a MAC PDU, the UE combines the remaining space and the already allocated space for "Regular" and "Periodic" BSR to include a long BSR. FIG. 28 shows how the MAC PDU would looks like when this solution is applied to problem shown in FIG. 26.

Details #10

It is important for the scheduler to be able to differentiate a padding BSR from a regular BSR. If the location restriction is removed, a separate LCID for padding BSR should be used. Here, the Padding BSR should be explicitly indicated by Padding Subheader.

if the number of padding bits is equal to or larger than the size of the Short BSR plus its subheader but smaller than the size of the Long BSR plus its subheader, report Short BSR of the LCG with the highest priority logical channel with buffered data;

else if the number of padding bits is equal to or larger than the size of the Long BSR plus its subheader, report Long BSR.

Having a general rule to handle padding may be simpler than introducing exceptions: regardless of whether a regular BSR is included, the UE always apply the same rules to include a padding BSR.

If a BSR is already included in the MAC PDU, another BSR may not be needed. Another BSR may increase the MAC processing. The BSR fields are populated after the PDU is built, therefore the two BSRs may be identical copies.

If a Short BSR is used, it may means that the other three not reported groups have no buffered data. Thus, the Short BSR ("Regular" or "Periodic") may imply the buffer status of all groups. On the other hand, if a Long BSR is used, the buffer status of all groups may also be reported.

Details #11

The type of BSR that should be included when multiple BSR is triggered need consideration.

Even if multiple events occur by the time a BSR can be transmitted, only one BSR may be included in the MAC PDU.

For example, when a short BSR is triggered due to expiry of periodic timer and the remaining padding space is enough to include a long BSR, the type of BSR to be included should be determined. When a Regular short BSR is triggered and padding space allows only a short BSR, the two short BSRs may be combined to generate a long BSR. Several solutions to the above situations seem possible:

Option A: Padding BSR is not triggered when regular BSR or periodic BSR has been triggered. In this way, triggering of different size BSRs can be avoided.

Option B: In a MAC PDU, maximum one of either Regular BSR or Periodic BSR can be included and maximum one of Padding BSR can be included.

Option C: If Regular BSR or Periodic BSR is triggered and if a padding BSR is also triggered, the largest BSR that fits into a MAC PDU is included.

Due to simplicity, the above option A may be most practical.

It should be noted that there are several different types of BSR. When multiple BSRs are triggered, only one BSR is included.

However, there is a question about which BSR should be included when multiple BSR is triggered. Padding BSR is not triggered when regular BSR or periodic BSR is already triggered. MAC entity cannot decide which BSR to include when multiple BSR is triggered.

The Buffer Status reporting procedure is used to provide the serving eNB with information about the amount of data in the UL buffers of the UE. A Buffer Status Report (BSR) shall be triggered if any of the following events occur:

UL data arrives in the UE transmission buffer and the data belongs to a logical channel with higher priority than those for which data already existed in the UE transmission buffer, in which case the BSR is referred below to as "Regular BSR";

UL resources are allocated and number of padding bits is larger than the size of the Buffer Status Report MAC control element, in which case the BSR is referred below to as "Padding BSR";

a serving cell change occurs, in which case the BSR is referred below to as "Regular BSR";

the PERIODIC BSR TIMER expires, in which case the BSR is referred below to as "Periodic BSR".

For Regular and Periodic BSR:

if only one LCG has buffered data in the TTI where the BSR is transmitted: report short BSR;

else if more than one LCG has buffered data in the TTI where the BSR is transmitted: report long BSR.

For padding BSR:
if Regular BSR or Periodic BSR has not been triggered;
if the number of padding bits is equal to or larger than the size of the Short BSR but smaller than the size of the Long BSR, report Short BSR of the LCG with the highest priority logical channel with buffered data;
else if the number of padding bits is equal to or larger than the size of the Long BSR, report Long BSR.

If the Buffer Status reporting procedure determines that a BSR has been triggered since the last transmission of a BSR:
if the UE has UL resources allocated for new transmission for this TTI:
instruct the Multiplexing and Assembly procedure to generate a BSR MAC control element;
restart the PERIODIC BSR TIMER.
else if a Regular BSR has been triggered since the last transmission of a BSR:
a Scheduling Request shall be triggered.

It should be noted that even if multiple events occur by the time a BSR can be transmitted, only one BSR may be included in the MAC PDU.

A pending BSR shall be cancelled in case the UL grant can accommodate all pending data but is not sufficient to accommodate the BSR MAC control element in addition.

As described above, the various exemplary embodiments of the present invention relate to a method and system for processing buffer status reports (BSRs). When BSR triggering is performed, the size(s) of the necessary sub-header(s) are also to be considered together in addition to the BSR size. Doing so allows the sub-header(s) to be inserted (included) into the MAC PDU (or transport block (TB) or other data unit).

The Buffer Status reporting procedure is used to provide the serving eNB with information about the amount of data available for transmission in the UL buffers of the UE. For the Buffer Status reporting procedure, the UE shall consider all radio bearers which are not suspended and may consider radio bearers which are suspended.

A Buffer Status Report (BSR) shall be triggered if any of the following events occur:
UL data, for a logical channel which belongs to a LCG, becomes available for transmission in the RLC entity or in the PDCP entity, and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
UL resources are allocated and number of padding bits is equal to or larger than the size of the Buffer Status Report MAC control element, in which case the BSR is referred below to as "Padding BSR";
a serving cell change occurs, in which case the BSR is referred below to as "Regular BSR";
the RETX_BSR_TIMER expires and the UE has data available for transmission, in which case the BSR is referred below to as "Regular BSR";
the PERIODIC_BSR_TIMER expires, in which case the BSR is referred below to as "Periodic BSR".

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has buffered data in the TTI where the BSR is transmitted: report Truncated BSR of the LCG with the highest priority logical channel with data available for transmission;
else report Short BSR.
else if the number of padding bits is equal to or larger than the size of the Long BSR plus its subheader, report Long BSR.

If the Buffer Status reporting procedure determines that at least one BSR has been triggered since the last transmission of a BSR or if this is the first time that at least one BSR is triggered:
if the UE has UL resources allocated for new transmission for this TTI:
instruct the Multiplexing and Assembly procedure to generate a BSR MAC control element;
start or restart the PERIODIC_BSR_TIMER except when the BSR is a Truncated BSR;
start (if not running) or restart (if running) the RETX_BSR_TIMER.
else if a Regular BSR has been triggered:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart (if running) the RETX_BSR_TIMER upon reception of a grant for transmission of new data on UL-SCH.

All triggered BSRs shall be cancelled in case the UL grant can accommodate all pending data available for transmission but is not sufficient to additionally accommodate the BSR MAC control element. All triggered BSRs shall be cancelled when a BSR is included in a MAC PDU for transmission.

Hereafter, the MAC PDU (DL-SCH and UL-SCH except transparent MAC and Random Access Response) will be explained further.

A MAC PDU consists of a MAC header, zero or more MAC Service Data Units (MAC SDU), zero, or more MAC control elements, and optionally padding; as described in FIG. 4.

Both the MAC header and the MAC SDUs are of variable sizes.

A MAC PDU header consists of one or more MAC PDU sub-headers; each subheader corresponding to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and sub-headers for fixed sized MAC control elements consist solely of the four header fields R/R/E/LCID. It follows that a MAC PDU subheader corresponding to padding consists of the four header fields R/R/E/LCID.

MAC PDU sub-headers have the same order as the corresponding MAC SDUs, MAC control elements and padding.

MAC control elements, are always placed before any MAC SDU.

Padding occurs at the end of the MAC PDU, except when single-byte or two-byte padding is required but cannot be achieved by padding at the end of the MAC PDU. Padding may have any value and the UE shall ignore it.

When single-byte or two-byte padding is required but cannot be achieved by padding at the end of the MAC PDU, one or two MAC PDU sub-headers corresponding to padding are inserted before the first MAC PDU subheader corresponding to a MAC SDU; or if such subheader is not present, before the last MAC PDU subheader corresponding to a MAC control element.

A maximum of one MAC PDU can be transmitted per TB per UE.

According to the present invention, regarding MAC Control Elements, there are Buffer Status Report MAC Control Elements.

Buffer Status Report (BSR) MAC control elements consist of either:
  Short BSR and Truncated BSR format: one LCG ID field and one corresponding Buffer Size field (FIG. 7); or
  Long BSR format: four Buffer Size fields, corresponding to LCG IDs #0 through #3 (FIG. 8).

The BSR formats are identified by MAC PDU subheaders with LCIDs.
  The fields LCG ID and Buffer Size are defined as follows:
  LCG ID: The Logical Channel Group ID field identifies the group of logical channel(s) which buffer status is being reported. The length of the field is 2 bits;
  Buffer Size: The Buffer Size field identifies the total amount of data available across all logical channels of a logical channel group after the MAC PDU has been built. The amount of data is indicated in number of bytes. It shall include all data that is available for transmission in the RLC layer and in the PDCP layer. The size of the RLC and MAC headers are not considered in the buffer size computation. The length of this field is 6 bits.

Figure 29:
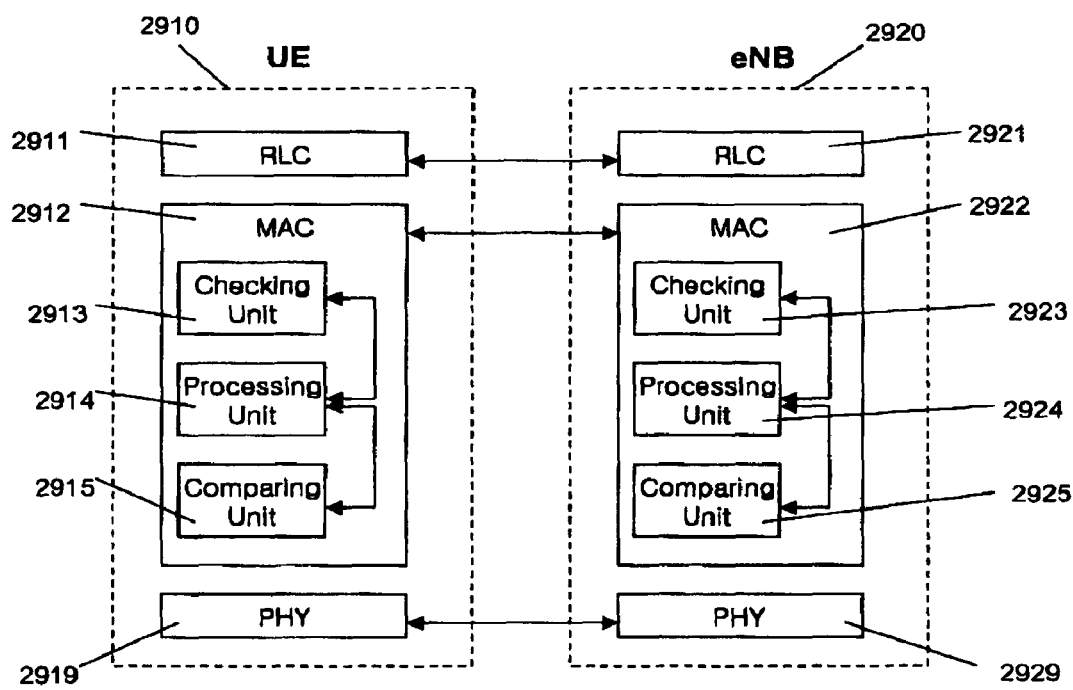
FIG. 29 shows an exemplary structure of a UE and an eNB with certain protocol layers including a MAC entity.

Referring to FIG. 29, the present invention provides a medium access control (MAC) entity (2912, 2922) in a UE 2910 and in an eNB 2920. The MAC entity comprises a checking unit (2913, 2923) that checks whether any padding region is available in a MAC PDU that was constructed, a comparing unit (2915, 2925) that compares the number of padding bits with the size of a buffer status report (BSR) plus its sub-header; and a processing unit (2914,2924) that cooperates with the checking unit and the comparing unit to trigger a buffer status report (BSR) procedure if the number of padding bits is larger than the size of the BSR plus its sub-header, including the BSR and its sub-header in the MAC PDU, and setting an LCID in the sub-header to indicate a BSR is included, the BSR having been triggered due to padding.

The processing unit may further perform the steps of receiving a grant from a network to construct the MAC PDU, and constructing the MAC PDU by using higher logical channel data and MAC control elements. The MAC PDU may include a short BSR having a logical channel identification (LCID) field of 2 bytes and a buffer size of 6 bytes. A separate logical channel identification (LCID) field may be set by the processing unit for a short BSR or for a truncated BSR. The LCID field may identify the logical channel instance of the corresponding MAC SDU or the type of the corresponding MAC control element or padding for the DL-SCH and UL-SCH respectively. The LCID field may contain either a first value for a short buffer status report or a second value for a long buffer status report. The size of the BSR may be 4 bytes or 8 bytes.

The present invention also provides a method of constructing a data unit to include a buffer status report (BSR), comprising the steps of checking whether any padding region is available in a MAC PDU that was constructed, comparing number of padding bits with the size of the BSR plus its sub-header, if the number of padding bits is larger than the size of the BSR plus its sub-header, triggering BSR, including the BSR and its sub-header in the MAC PDU, and setting an LCID in the sub-header to indicate a BSR is included, the BSR having been triggered due to padding.

The method further comprises, receiving a grant from a network to construct the MAC PDU, and constructing the MAC PDU by using higher logical channel data and MAC control elements. The MAC PDU may include a short BSR having a logical channel identification (LCID) field of 2 bytes and a buffer size of 6 bytes. A separate logical channel identification (LCID) field may be set for a short BSR or for a truncated BSR. The LCID field may identify the logical channel instance of the corresponding MAC SDU or the type of the corresponding MAC control element or padding for the DL-SCH and UL-SCH respectively. The LCID field may contain either a first value for a short buffer status report or a second value for a long buffer status report. The size of the BSR may be 4 bytes or 8 bytes.

The various features and concepts described herein may be implemented in software, hardware, or a combination thereof. For example, a computer program (that is executed in a computer, a terminal or a network device) for a method and system for processing buffer status reports (BSRs) may comprise one or more program code sections for performing various tasks. Similarly, a software tool (that is executed in a computer, a terminal or a network device) for a method and system for processing buffer status reports (BSRs) may comprise program code portions for performing various tasks.

The method and system for processing buffer status reports (BSRs) according to the present invention are compatible with various types of technologies and standards. Certain concepts described herein are related to various types of standards, such as GSM, 3GPP, LTE, IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured to support a method and system for processing buffer status reports (BSRs).

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. In a mobile telecommunications system, a method of generating a data unit, wherein the data unit is employed, at least in part, to provide information to a serving base station about the amount of data that is available for transmission in an uplink, the method comprising:
  checking whether padding bits are available in the data unit; and
  if there are padding bits available in the data unit, inserting, into the data unit, a short buffer status report (BSR) and a sub-header corresponding to the short BSR if it is determined that the number of padding bits is greater than or equal to the size of the short BSR plus a sub-header corresponding to the short BSR, but less than the size of a long BSR plus a sub-header corresponding to the long BSR and it is determined that only one logical channel group has buffered data available to transmit via the uplink.

2. The method of claim 1 further comprising:
generating a BSR and the sub-header corresponding to the BSR, wherein the sub-header includes a value that identifies the BSR as a short BSR.

3. The method of claim 2, wherein generating the BSR comprises:
inserting into the BSR a first value that identifies the logical channel group that has buffered data available to transmit via the uplink; and
inserting into the BSR a second value that identifies the amount of data associated with the logical channel group that is available for transmission via the uplink.

4. The method of claim 1 further comprising:
inserting, into the data unit, a long BSR and a sub-header corresponding to the long BSR if it is determined that the number of padding bits is greater than or equal to the size of the long BSR plus the sub-header corresponding to the long BSR.

5. The method of claim 4 further comprising:
generating a BSR and a sub-header corresponding to the BSR, wherein the sub-header includes a value that identifies the BSR as a long BSR.

6. The method of claim 5, wherein generating the BSR comprises:
inserting into the BSR a plurality of values, wherein each of the plurality of values identifies an amount of data associated with a corresponding logical channel group that has buffered data available to transmit via the uplink.

7. The method of claim 1, wherein the data unit is a Medium Access Control (MAC) packet data unit (PDU).

8. The method of claim 7 further comprising:
generating a BSR in the form of a MAC control element;
inserting into the MAC PDU one or more MAC control elements, including the BSR; and
inserting into the MAC PDU a corresponding sub-header for each of the one or more MAC control elements, wherein a sub-header corresponding to the BSR includes a value that identifies the BSR as a short BSR.

9. The method of claim 8, wherein generating the BSR in the form of a MAC control element comprises:
inserting into the BSR a first value that identifies the logical channel group that has buffered data available to transmit via the uplink; and
inserting, into the BSR a second value that identifies the amount of data associated with the logical channel group that is to be transmitted via the uplink.

10. In a mobile telecommunications system, a medium access control (MAC) entity in a mobile station comprising:
a checking unit for determining whether padding bits are available in a MAC packet data unit (PDU); and
a processing unit for inserting into the MAC PDU a short buffer status report (BSR) and a sub-header corresponding to the short BSR if it is determined that the number of padding bits is greater than or equal to the size of the short BSR plus the sub-header corresponding to the short BSR, but less than the size of a long BSR plus a sub-header corresponding to the long BSR, and it is determined that only one logical channel group has buffered data available to transmit via an uplink.

11. The MAC entity of claim 10 further comprising:
a comparing unit for comparing the number of padding bits, if padding bits are available, to the size of the short BSR plus the sub-header corresponding to the short BSR and to the size of the long BSR plus the sub-header corresponding to the long BSR.

12. The MAC entity of claim 10, wherein the processing unit is further configured to generate a BSR and a sub-header corresponding to the BSR, such that the sub-header includes a value that identifies the BSR as a short BSR.

13. The MAC entity of claim 12, wherein the processing unit is further configured to:
insert into the BSR a first value that identifies the logical channel group that has buffered data available to transmit via the uplink; and
insert into the BSR a second value that identifies the amount of data associated with the logical channel group that is available for transmission via the uplink.

14. The MAC entity of claim 13, wherein the processing unit is further configured to insert into the MAC PDU a long BSR and a sub-header corresponding to the long BSR if it is determined that the number of padding bits is greater than or equal to the size of the long BSR plus the sub-header corresponding to the long BSR.

15. The MAC entity of claim 14, wherein the processing unit is further configured to generate the BSR and the sub-header corresponding to the BSR, such that the sub-header includes a value that identifies the BSR as a long BSR.

16. The MAC entity of claim 15, wherein the processing unit is further configured to insert into the BSR a plurality of values, wherein each of the plurality of values identifies an amount of data associated with a corresponding logical channel group that has buffered data available to transmit via the uplink.

17. The MAC entity of claim 10, wherein the processing unit is further configured to:
generate a BSR in the form of a MAC control element;
insert into the MAC PDU one or more MAC control elements, including the BSR; and
insert into the MAC PDU a corresponding sub-header for each of the one or more MAC control elements, wherein the sub-header corresponding to the BSR includes a value that identifies the BSR as a short BSR.

18. The MAC entity of claim 17, wherein the processing unit is further configured to:
insert into the BSR a first value that identifies the logical channel group that has buffered data available to transmit via the uplink; and
insert, into the BSR a second value that identifies the amount of data associated with the logical channel group that is to be transmitted via the uplink.

* * * * *